(12) United States Patent
Grouzdev

(10) Patent No.: US 7,124,228 B2
(45) Date of Patent: Oct. 17, 2006

(54) BUS COMMUNICATION ARCHITECTURE, IN PARTICULAR FOR MULTICOMPUTING SYSTEMS

(75) Inventor: Vladimir Grouzdev, Saint Germain-en-Laye (FR)

(73) Assignee: Sun Microsystems, Inc., Santa Clara, CA (US)

( * ) Notice: Subject to any disclaimer, the term of this patent is extended or adjusted under 35 U.S.C. 154(b) by 368 days.

(21) Appl. No.: 10/192,759

(22) Filed: Jul. 10, 2002

(65) Prior Publication Data

US 2003/0074513 A1    Apr. 17, 2003

(30) Foreign Application Priority Data

Jul. 10, 2001    (FR)    ................... 01 09166

(51) Int. Cl.
| | |
|---|---|
| G06F 13/36 | (2006.01) |
| G06F 15/16 | (2006.01) |
| G06F 12/16 | (2006.01) |
| G06F 9/44 | (2006.01) |

(52) U.S. Cl. ............... 710/306; 709/321; 711/153; 717/124; 719/312

(58) Field of Classification Search ............ 710/306, 710/104, 153; 709/321; 717/124; 719/321–322, 719/327, 312; 711/147, 150, 153
See application file for complete search history.

(56) References Cited

U.S. PATENT DOCUMENTS

| | | | |
|---|---|---|---|
| 5,694,556 A | 12/1997 | Neal et al. | |
| 5,809,303 A * | 9/1998 | Senator | ...................... 719/325 |
| 5,835,738 A | 11/1998 | Blackledge, Jr. et al. | |
| 5,961,606 A | 10/1999 | Talluri et al. | |
| 6,049,808 A | 4/2000 | Talluri et al. | |
| 6,085,238 A | 7/2000 | Yuasa et al. | |
| 6,101,555 A * | 8/2000 | Goshey et al. | ............... 719/321 |
| 6,112,271 A * | 8/2000 | Lanus et al. | ................. 710/306 |
| 6,161,197 A * | 12/2000 | Lanus et al. | ................... 714/11 |
| 6,223,240 B1 * | 4/2001 | Odenwald et al. | .......... 710/311 |
| 6,487,619 B1 * | 11/2002 | Takagi | ........................ 710/105 |
| 6,574,695 B1 * | 6/2003 | Mott et al. | ................... 710/302 |
| 6,615,383 B1 | 9/2003 | Talluri et al. | |
| 6,618,783 B1 * | 9/2003 | Hammersley | ................ 710/305 |
| 6,662,654 B1 * | 12/2003 | Miao et al. | .................... 73/488 |
| 6,772,420 B1 * | 8/2004 | Poger et al. | ................. 719/327 |
| 6,785,894 B1 * | 8/2004 | Ruberg | ........................ 719/321 |
| 6,851,056 B1 | 2/2005 | Evans et al. | |
| 6,856,615 B1 | 2/2005 | Barve | |
| 6,895,588 B1 * | 5/2005 | Ruberg | ........................ 719/321 |
| 2003/0200451 A1 | 10/2003 | Evans et al. | |

OTHER PUBLICATIONS

Sun Microsystems, ChorusOS 4.0 Introduction, Dec. 1999, Sun Microsystems, Inc., part No. 806-0610-10.*

Sun Microsystems, ChorusOS 4.0 Device Driver Framework Guide, Dec. 1999, Sun Microsystems Inc., part No. 806-0616-10.*

(Continued)

*Primary Examiner*—Mark H. Rinehart
*Assistant Examiner*—Christopher Daley
(74) *Attorney, Agent, or Firm*—Robert C. Kowert; Meyertons, Hood, Kivlin, Kowert & Goetzel, P.C.

(57) ABSTRACT

A computer system comprises first and second computer boards, each having a processor, onboard memory, an onboard bus, e.g. a processor bus, and a bus-to-bus bridge for interconnecting the onboard bus with an external bus; the boards have remote slave drivers, and communication drivers, comprising communication management functions, and forming communication chains or channels between the remote slave drivers and the onboard memories.

32 Claims, 9 Drawing Sheets

OTHER PUBLICATIONS

Hu et al., "Formal Verification of the HAL SI System Cache Coherence Protocol," Int'l Conf. On Computer Design, 1997, pp. 438-444.

Acher et al., "A PCI-SCI Bridge for Building a PC Cluster with Distributed Shared Memory," Sixth International Workshop on SCI-Based Low-Cost/High-Performance Computing, Sep. 1996, (8 pages) 444.

Amza et al., "Treadmarks: Shared Memory omputing on Networks of Workstations," IEEE Computer, 29(2) Feb. 1996. (20 pages).

Sultan et al., "Scalable Fault-Tolerant Distributed Shared Memory," 2000 IEEE, (13 pages).

* cited by examiner

| xH D0 | Selected Communication Management Protocol | D01 |
| | Dedicated Portion of Memory | D02 |
| | Cross - interrupt Delivery | D03 |
| | Framework Config. Arbitration (GH only) | D04 |

| xM D2 | Selected Communication Management Protocol | D21 |
| | Export Local Memory | D22 |
| | Import Remote Memory | D23 |
| | Remote Communication of Bus Control Messages | D24 |
| | Cross Interrupt Delivery | D25 |

| NX D1 | Selected Communication Management Protocol (Bus Control Protocol) | D11 |

| RS D3 | Access Remote Memory | D31 |
| | Cross Interrupt Transmission | D32 |

*FIG. 13*

BUS COMMUNICATION ARCHITECTURE, IN PARTICULAR FOR MULTICOMPUTING SYSTEMS

BACKGROUND OF THE INVENTION

The invention relates to a bus communication architecture, more particularly for distributed and/or multi-computing systems.

Existing input/output busses, e.g. the PCI I/O bus, are basically designed to interconnect a processor board with input/output boards ("devices"), e.g. hard disk controllers. Bus bridges may be used in a number of cases: for example, a system-to-PCI bus bridge may be provided between a processor or system bus within a board and the PCI bus itself; a PCI-to-PCI bus bridge may be used where the number of existing devices is higher than the maximum connection capability of a single PCI bus; various other bus bridges may also be used where connection to another bus operating differently is desired, for example PCI to ISA, or PCI to SCSI.

Generally, a PCI I/O bus provides parallel processing for a plurality of boards, including I/O boards, and one or more processor boards. Where several processor boards are present, one of them may act as a master board.

Communication between the boards may be enabled by providing in each board a memory area which is made accessible from the bus, or, in other words, "exported" on the bus. A communication mechanism is also necessary. An example of such a mechanism has been proposed in: "Compact PCI, Multi-Computing Interface Specification", PICMG 2.14 D0.60, May 12, 2000, PCI Industrial Computer Manufacturers Group (in short "PICMG"). Although interesting, the PICMG approach appears to be much hardware-dependent, and therefore raises certain problems, for example where use on a different bus architecture may be required.

SUMMARY OF THE INVENTION

A computer system in accordance with this invention may comprise first and second computer boards, each having a processor, onboard memory, an onboard bus, e.g. a processor bus, and a bus-to-bus bridge for interconnecting the onboard bus with an external bus; the boards have remote slave drivers, and communication drivers, comprising communication management functions, and forming communication chains or channels between the remote slave drivers and the onboard memories.

This invention may also be viewed as a method of interconnecting first and second computer boards, each having a processor, onboard memory, an onboard bus, and a bus-to-bus bridge for interconnecting the onboard bus with an external bus. The method comprises the steps of:

a. providing each board with a remote slave driver, and b. providing the boards with communication drivers, comprising communication management functions, and forming communication chains between the remote slave drivers and the onboard memories.

This invention also encompasses a software product, comprising the drivers as used in the above computer system and/or for use in the above defined method. This extends to optional developments of the system and/or method, to be described hereinafter. The invention further encompasses a software product, comprising driver classes for use in generating the above software product. It still further encompasses larger software products, e.g. an operating system, comprising any of the above software product.

BRIEF DESCRIPTION OF THE DRAWINGS

Other alternative features and advantages of the invention will appear in the detailed description below and in the appended drawings, in which:

FIG. 13 is a diagram showing the general driver functions for driver classes.

DETAILED DESCRIPTION

As they may be cited in this specification, Sun, Sun Microsystems, Solaris, ChorusOS are trademarks of Sun Microsystems, Inc. SPARC is a trademark of SPARC International, Inc.

This patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Additionally, the detailed description is supplemented with the following Exhibits:

Exhibit A is a more detailed description of an exemplary embodiment of this invention, and Exhibit B contains code extracts illustrating an exemplary embodiment of this invention.

In the foregoing description, references to the Exhibits may be made directly by the Exhibit or Exhibit section identifier. One or more Exhibits are placed apart for the purpose of clarifying the detailed description, and of enabling easier reference. They nevertheless form an integral part of the description of the present invention. This applies to the drawings as well.

This invention also encompasses software code, especially when made available on any appropriate computer-readable medium. The expression "computer-readable medium" includes a storage medium such as magnetic or optic, as well as a transmission medium such as a digital or analog signal.

The detailed description may hereinafter refer to platforms based on the ChorusOS operating system, and uses the corresponding terminology. This is exemplary only and it should be understood that the invention is applicable to a variety of computer platforms. Generally, ChorusOS has the following abilities:

work with various processors and various main boards, adapted to specific products;

be loadable in RAM from a so called "[OS] archive" or "image file", stored e.g. in persistent memory or as a file on the hard disk, depending upon the actual platform architecture;

define independent processes (named "actors"), exchanging messages.

Figure 1:
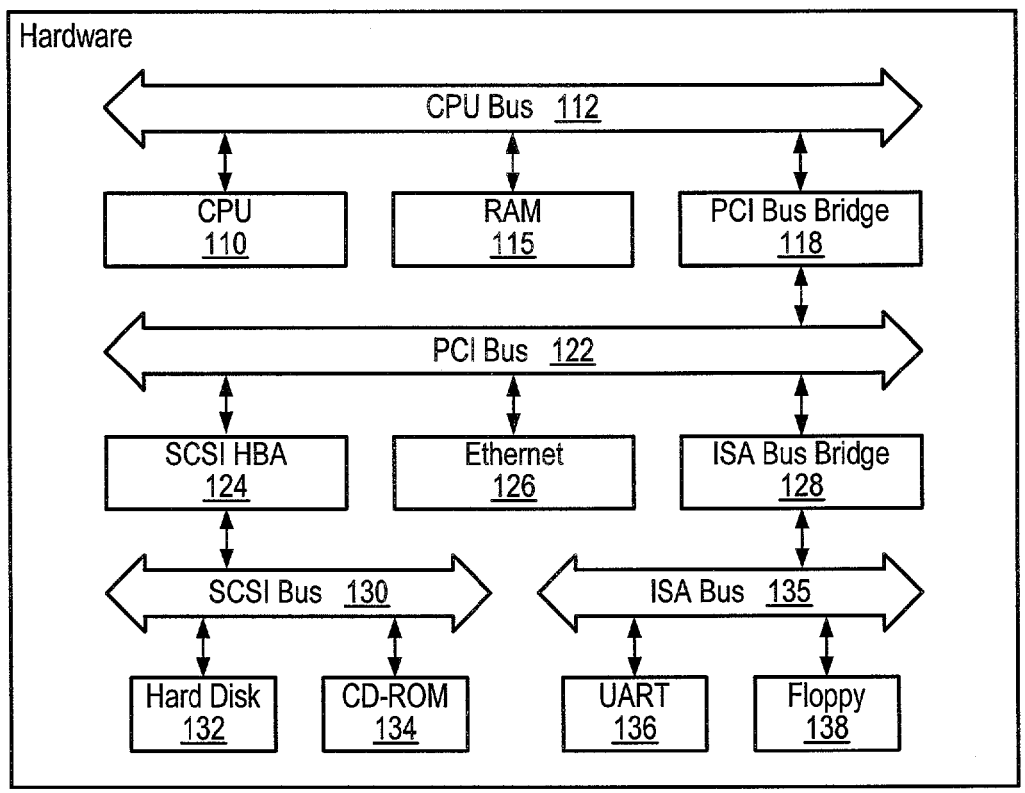
FIG. 1 schematically illustrates a known hardware computer structure.

The exemplary hardware computer structure of FIG. 1 comprises a CPU 110, having a processor or CPU Bus 112, and RAM 115 connected thereto. A PCI Bus Bridge 118 is interposed between CPU Bus 112 and PCI Bus 122. PCI Bus 122 may in turn be connected e.g. to an Ethernet device 126, an SCSI Host Bus Adapter 124, and an ISA Bus Bridge 128. SCSI Host Bus Adapter 124 is connected to SCSI Bus 130, which is connected to one or more hard disks 132, and one or more CD-Rom drives 134. ISA Bus 135 is connected to one or more UART devices 136, and to one or more floppy drives 138.

As known, the devices necessitate pieces of code named drivers to be able to correctly operate under control of the CPU. In accordance with one aspect of this invention, the tendency is to have one driver for each device, with the driver services being those required for the device.

Figure 2:
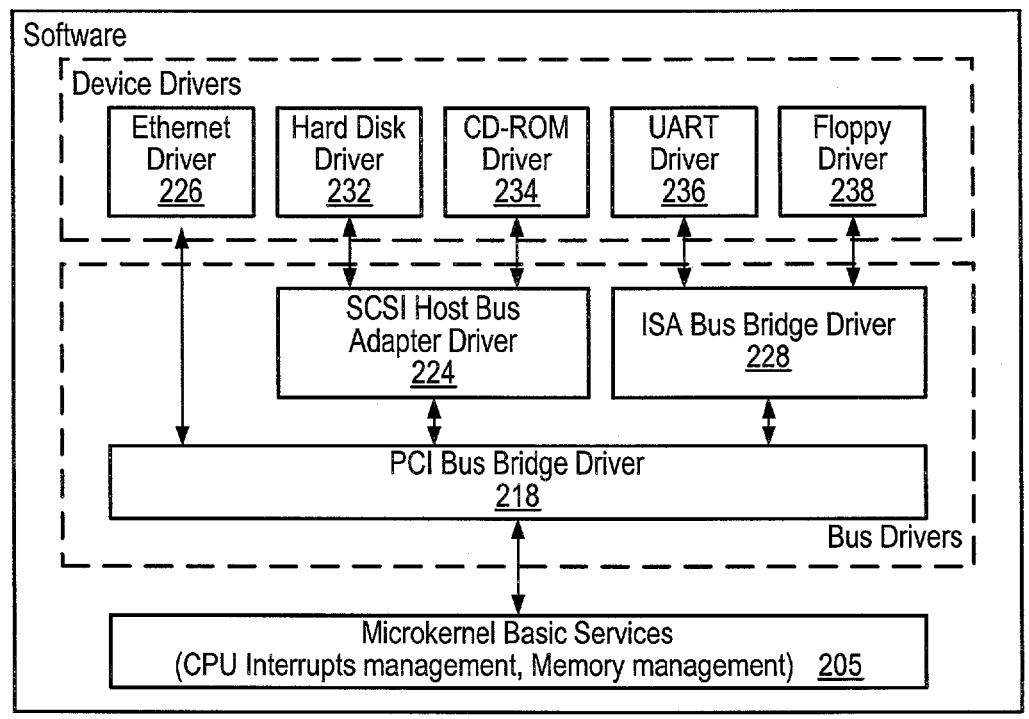
FIG. 2 schematically illustrates a device driver system for the hardware computer structure of FIG. 1.

Accordingly, the device driver framework may have the structure shown in FIG. 2. The micro kernel basic services, including CPU Interrupt management and memory management, form a module 205, with PCI Bus Bridge driver 218 connected thereto. Module 218 in turn receives connection from SCSI Host Bus Adapter driver 224, and from ISA Bus Bridge driver 228, as well as from an Ethernet peripheral driver 226. SCSI Host Bus Adapter driver 224 has one or more hard disk drivers 232, one or more CD-Rom drivers 234. ISA Bus Bridge driver has one or more UART drivers 236 and one or more floppy drivers 238.

The Interface layering will now be described with reference to FIG. 3. In the example, the interfaces specified by ChorusOS for the device drivers implementation are split logically in two sets:

Drivers/Kernel Interface (DKI), which comprise a set of services provided by the microkernel 205 for driver implementation. In other words, all DKI services are implemented in the microkernel, and used by device drivers. Typically drivers for buses and devices connected to the CPU local bus will use all DKI services.

Device Drivers Interface (DDI), which comprises a set of services provided by drivers for the driver clients implementation. In fact, a driver client may itself be a driver. For instance a device driver is typically a bus driver client. Thus, all DDI services are implemented in a driver, and used by the upper layer drivers, or directly by drivers client applications.

The DKI interface defines all microkernel services provided for drivers implementation. These services are split in two categories. Common DKI services 207 have the same API for all platforms and processors, and are usually used by all kind of drivers, whatever the layer level is. Processor family specific DKI services 206 may have a different API for each different processor family and are usually used only by the lowest-level drivers, i.e. drivers for buses and devices which are directly connected to the CPU local bus 112 (FIG. 1).

The Processor family specific DKI services 206 cover: Processor interrupts management, Processor caches management, Processor specific I/O services and Physical to virtual memory mapping. Some or all of these services exist, and may be implemented in known fashion. These DKI services operate with the CPU bus (the root of the device tree) to some extent like DDIs with devices; there is a DKI service for each particular CPU bus function, and the design of the DKI services is rendered modular, thus improving the portability.

Figure 3:
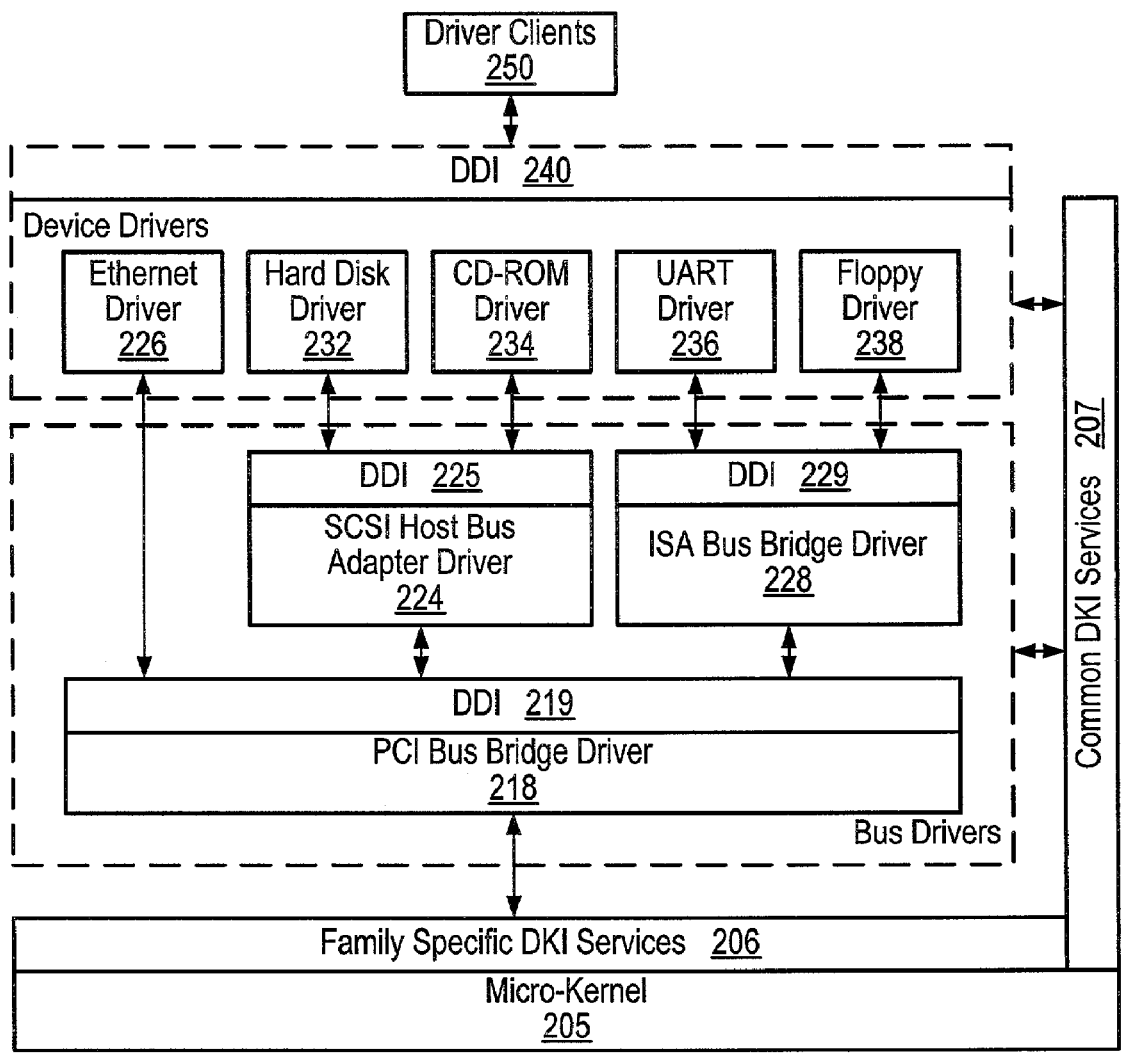
FIG. 3 illustrates a device driver framework corresponding to the device driver system of FIG. 2.

FIG. 3 also shows that the other drivers have interfaces arranged as DDI services as follows:

DDI 219 for PCI bus bridge driver 218;

DDI 225 for SCSI host bus adapter driver 224;

DDI 229 for ISA bus bridge driver 228; and

DDI 240 diagrammatically showing the DDIs for all other end drivers, communicating with driver clients 250 in application programs.

Figure 4:
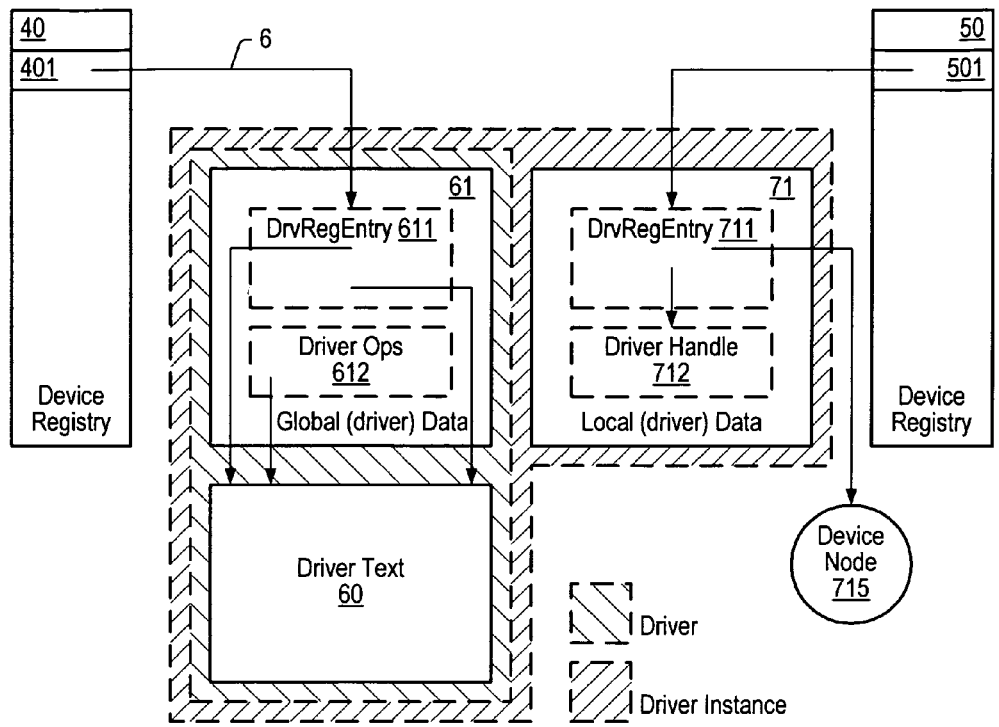
FIG. 4 illustrates a device registry and a driver registry, cooperating with a driver component and an instantiation of that driver component.

FIG. 4 shows a driver registry 40, having a particular driver record 401, and a Device Registry 50, having a particular device record 501.

Many drivers exist. Only one is shown in FIG. 4 for clarity. A driver 6 has driver program code ("driver text") 60 and global driver data 61, comprising:

a driver operations section ("driver ops") 612, adapted to provide services or functions, using driver program code 60, and a driver registry entry section ("DrvRegEntry") 611.

Driver record 401 has a pointer to "DrvRegEntry" 611 of the particular driver 6 being considered. For initialization and shut-down, the "DrvRegEntry" 611 may optionally define entry points to device independent routines in the driver, e.g. "drv_probe", "drv_bind", "drv_init" and "drv_unload", to be discussed hereinafter.

Driver 6 of FIG. 4 is a generic driver object or "global" driver section, which is not used as such by devices. In accordance with the concepts of object programming, the devices needing the services of the particular driver 6 will use "instances" of the object (object class) defined by driver 6.

Such an instance basically comprises "local" driver data 71, defining the instance, together with the global driver section. The local driver data 71 comprises data forming an "internal" pointer to the driver object 6. "Internal" means that the pointer connects the driver instance to the global driver section within the driver. In other words, a driver instance comprises its local driver data plus the global driver section. Preferably, the local driver data 71 also comprises data forming an "external" pointer to at least one other driver, typically the parent driver (the root's parent driver are the DKI services).

The local driver data 71 may also include local device-oriented data, defining, in section 712:

data defining the current condition of the local device, and a device handle, for the local device associated with the driver instance.

Consideration is now given to the case of a driver instantiation for a leaf device in FIG. 4, i.e. one of the devices directly communicating with driver clients in FIG. 3. Such a leaf driver instance is also associated with a "Device registry entry". In FIG. 4, the device registry entry is shown as a section 711 in "local" device data 71 of the driver instance (However, the Device registry entry may alternatively be associated with the corresponding record 501 in device registry 50). In any case, each item in the Device Registry 50 in FIG. 4 has a corresponding "DevRegEntry" structure 711.

Device registry 50 forms the basis of a client-to-[leaf]-driver linking mechanism. For subsequently reaching a bus/nexus driver, a child-to-parent-driver linking mechanism is used.

As described above, the device drivers present at the leaf nodes are hardware device drivers. The applicant company has been faced to the problem of interconnecting computer boards, and has found that considerable advances may be obtained by making use of communication drivers within such boards, as it will now be explained.

Figure 5:
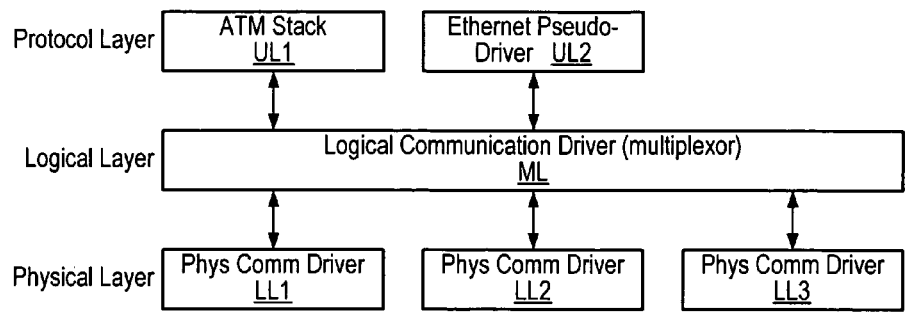
FIG. 5 schematically illustrates a layered model of use in understanding this invention.

This invention uses the observation that the layered model shown in FIG. 5 is applicable for example to the architecture of the ChorusOS bus communication framework. Such a layered approach enables the communication framework to be portable across different bus bridge architectures. The layers are:
- a protocol or upper layer, comprising e.g. ATM stack UL1 and/or Ethernet pseudo-driver UL2,
- a logical or middle layer ML, comprising a logical communication driver or multiplexer. The logical communication layer provides a basic communication protocol which then may be used by upper layers in order to provide a standard communication protocol (e.g., IP) to user applications (the protocol layer).
- a physical or low layer, comprising e.g. physical communication drivers LL1 through LL3.

The physical layer abstracts the bus architecture and bus bridge devices making the logical communication layer portable. Device Driver Interfaces (DDIs) are used by the physical communication drivers implementing the physical communication layer. Although the physical communication layer will be described mainly as designed for the PCI and CPCI architecture, it may apply to other I/O bus types as well, e.g. to the VME bus, which is widely used today in telecom equipment.

More precisely, the main task of the physical communication driver is to make shared memory resources accessible from any board within the communication domain. Typically, among all physical drivers running on a given CPU board, there will be one driver which provides access to the board local memory (exported to the bus). All other physical drivers provide access to the remote memory (imported from the bus). Thus, the total number of physical drivers on a CPU board (visible for multiplexer) is normally equal to the number of CPU boards communicating over the bus (or busses). Another task of the physical driver is to provide interrupt services allowing a so called "cross interrupt" to be sent from one CPU board to another.

The logical communication driver (multiplexer) uses services provided by the physical drivers (i.e., shared memory and cross interrupts) in order to implement a low level communication protocol over the bus. Various implementations of such a communication layer are possible. In the example, ChorusOS implements a quite basic communication protocol providing simplex (unidirectional) communication channels over the bus. Memory resources used by a channel are specified at channel creation time, i.e. a channel creator specifies the size of the FIFO used for the frames transmission over the channel. A channel has a point-to-point topology allowing only one writer and one reader per channel. The channel also implements flow control, notifying the reader and writer about a channel state transition. The reader receives notification when the channel state is changed from empty to non-empty. The writer is notified when the channel state is changed from full to non-fill. In order to take advantage of posted writes (usually supported by a bridge hardware), the channel buffer is preferably located at the reader local memory. Thus, the channel transmitter initiates write transactions on the I/0 bus which are asynchronously forwarded to another bus segment by the bridge hardware.

On top of the logical communication driver (multiplexer), other software layers may be implemented in order to provide a given (standard) communication protocol over the bus. For example, an ATM stack UL1 may use the multiplexer driver in order to create channels carrying AAL5 frames. Another example is an ethernet pseudo-driver UL2 which may be implemented using multiplexer channels. Such a driver may then be used by the ChorusOS IP stack in order to provide the standard IP protocol over the bus.

An underlying concept of this invention is to create a single communication domain for a hardware system comprised of multiple (hierarchically connected) bus segments. In other words, the physical layer enables a direct communication between two CPU boards, even if they are connected through multiple bus-to-bus bridges. Besides, in the case of a communication domain comprised of multiple busses, the physical layer design enables communication across heterogeneous busses. Furthermore, the physical layer design enables a dynamic configuration of the communication domain. In particular, the dynamic configuration mechanism allows the physical communication layer to support the CPU board hot swap on the cPCI bus.

The foregoing description refers mainly to the middle and low layers of FIG. 5.

Figure 6:
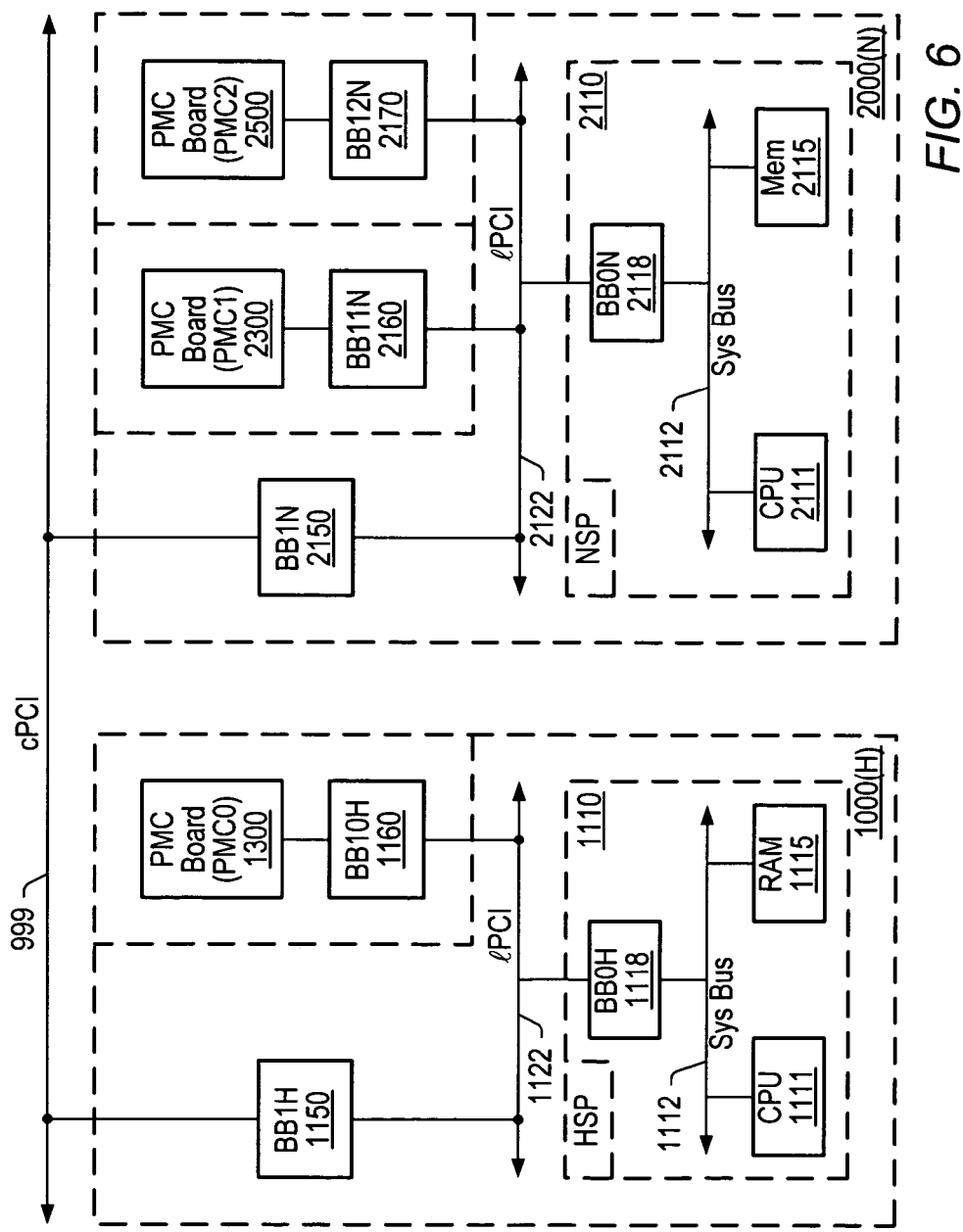
FIG. 6 shows an exemplary multi-processor board computer system in which this invention may apply.

Now with reference to FIG. 6, an exemplary multi-board configuration is shown. A first board 1000 has a main unit 1110, comprising processor 1111 and RAM 1115 connected to a local processor (system) bus 1112, in turn connected via bridge 1118 to a local PCI bus 1122. A PCI-to-PCI bus bridge 1150 interconnects local PCI bus 1122 with a common (or "external") PCI bus 999. Local PCI bus 1122 is also connected e.g. via PCI-to-local bus (or "QSpan") bridge 1160, to a PMC board 1300 ("PMC0"), which includes its own processor, not shown. (PMC stands for "PCI Mini connector"). Board 1000 forms a so called Host System Processor (HSP) Board.

One or more other Non-host System Processor (NSP) or "satellite" boards like 2000 may also be connected to common PCI bus 999. Like board 1000, board 2000 also has a main unit 2110, comprising a processor 2111 and RAM 2115 connected to a local processor (system) bus 2112, in turn connected via bridge 2118 to a local PCI bus 2122. A PCI-to-PCI bus bridge 2150 interconnects local PCI bus 2122 with common (or "external") PCI bus 999. Local PCI bus 2122 is also connected e.g. via PCI-to-Local bus (or "QSpan") bridge 2160, to a PMC board 2300 ("PMC1"), which includes its own processor (not shown). In this example, a second "QSpan" bridge 2170 is also connected to a second PMC board 2500 ("PMC2"). Various other multi-board multi-processor configurations may be contemplated.

In a specific, purely exemplary, embodiment, board 1000 may be a MCP750 board sold by Motorola, and board 2000 a MCPN750 of same origin. In the following, x is a thousand digit which may be 1, 2, etc, depending upon the number of items in presence. Bridges x118 may be the RAVEN model of Motorola. Bridges x150 may be the DEC21154 of Digital Equipment Corporation (now Intel). Boards x300 or x500 may be Force860 boards sold by Force Computing, each plugged into a respective PMC slot of the local PCI bus x122.

Generally, the hardware structure of FIG. 6 is viewed in this invention as defining a communication domain having 5 processors or CPUs (one in each of boards 1110, 1300, 2110, 2300 and 2500), interconnected via I/O busses, i.e. cPCI bus 999, and local PCI busses 1122 and 2122 (the processor busses 1112 and 2112 do not qualify as I/O busses).

This invention uses an object oriented approach of the driver architecture, with driver classes, and driver instances of such classes. Thus, there may at least some of the following four main communication driver classes:

host (xH), including the subclasses
    Global Host (GH), and
    local host (LH);
master (xM), including the subclasses
    Local Master (LM), and
    Remote Master (RM);
slave (RS);
nexus (NX)

FIGS. 7 through 11 illustrate the driver framework, as seen from the various processor boards in FIG. 6. In these figures, the block numbers are the same as in FIG. 5, however suffixed with the designation of the driver class attached to the block. Certain blocks, like 2150, have doubled driver instances, like 2150RM and 2150LM, for the above explained reasons. Each remote driver instance RM should be linked to a local driver instance LM. In fact, FIGS. 7 through 11 are interconnected by these coupled "xM" drivers.

Figure 7:
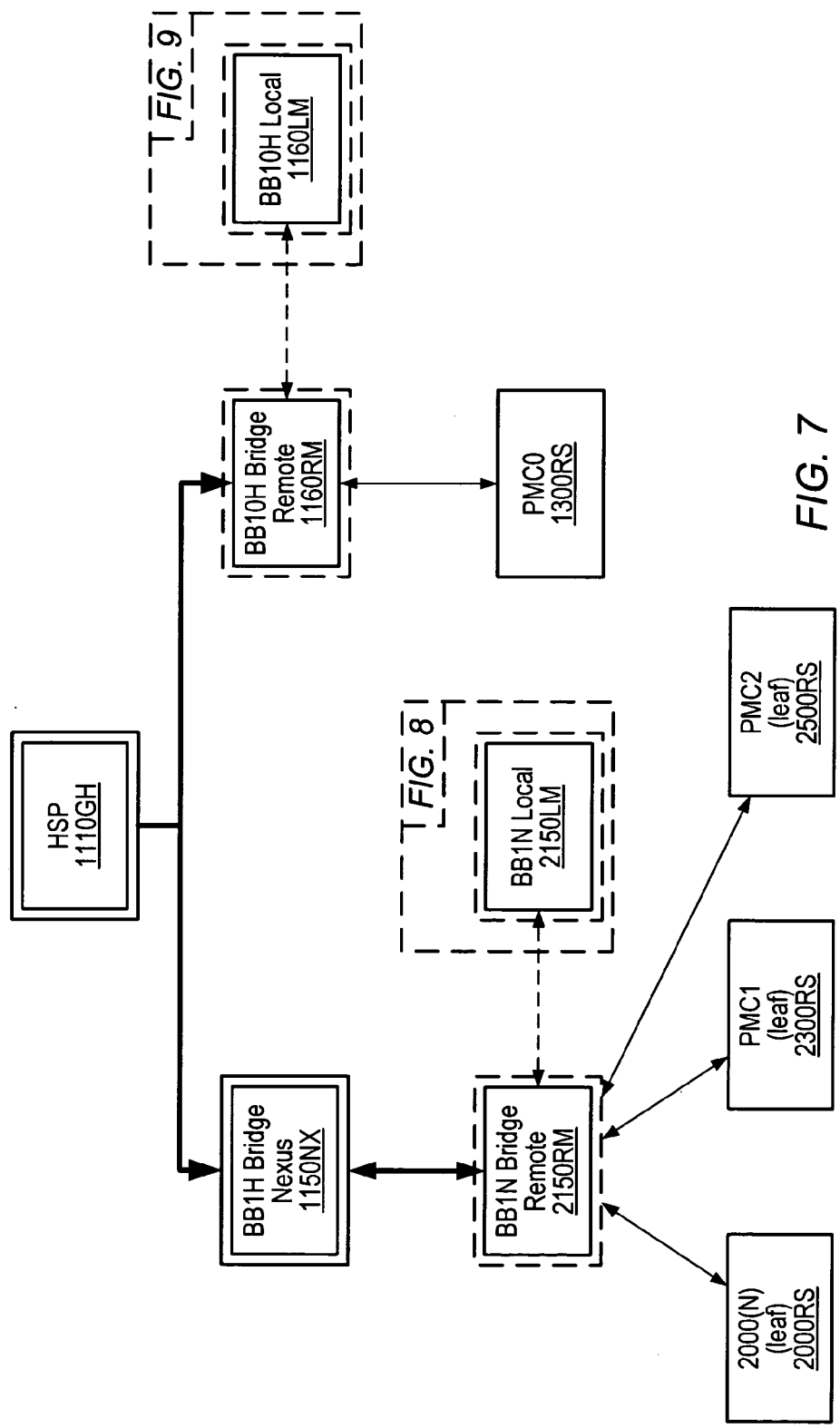
FIG. 7 shows the driver arrangement seen from board 1110 of FIG. 6 in more detail.
Figure 8:
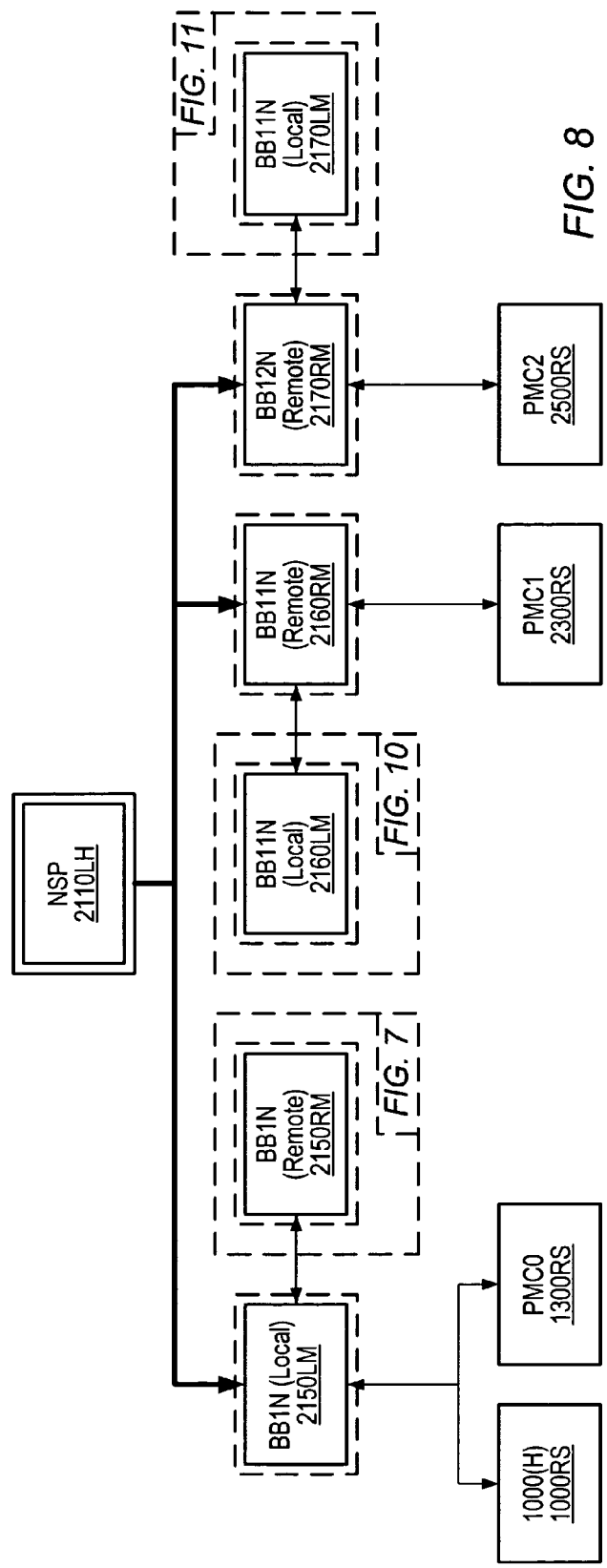
FIG. 8 shows the driver arrangement seen from board 2110 of FIG. 6 in more detail.
Figure 9:
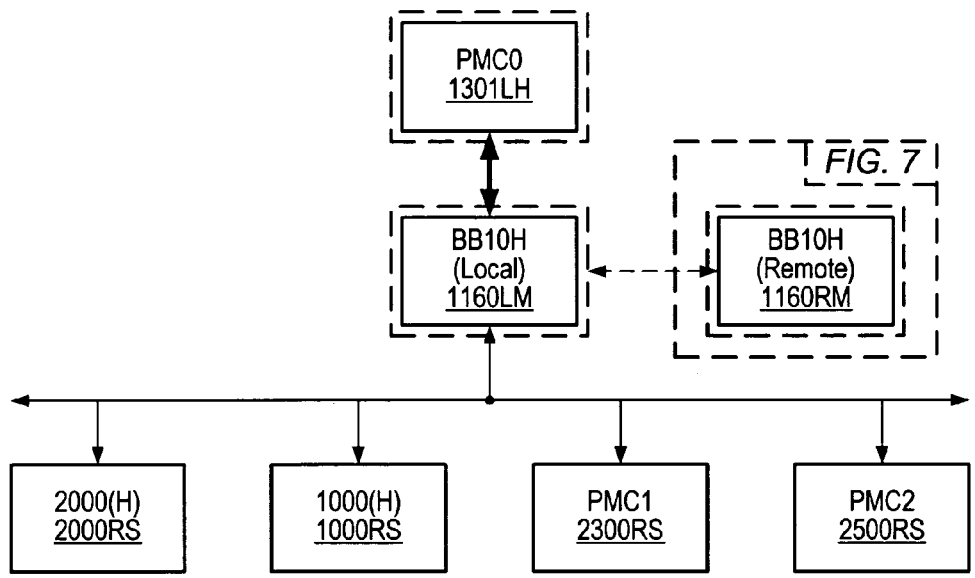
FIG. 9 shows the driver arrangement seen from board 1300 of FIG. 6 in more detail.

In FIG. 7 (board 1110 or HSP for Host System processor Board), the driver instance 1110GH forms a point of connection with:

the remote driver instance 1160RM of the corresponding PCI-to-Local bus bridge in connection with the driver instance 1300RS of the remote PMC0 board 1300,
the remote driver instance 1160RM is coupled with driver instance 1160LM in FIG. 9,
the auxiliary driver instance 1150NX of the corresponding PCI-to-PCI bridge,
driver instance 1150NX is in turn in connection with the remote driver instance 2150RM of the corresponding PCI-to-PCI bridge 2150, enabling the connection with the driver instances 2000RS, 2300RS, 2500RS of the corresponding remote boards 2000(N), PMC1, PMC2, respectively,
the remote driver instance 2150RM is coupled with driver instance 2150LM in FIG. 8.

Figure 10:
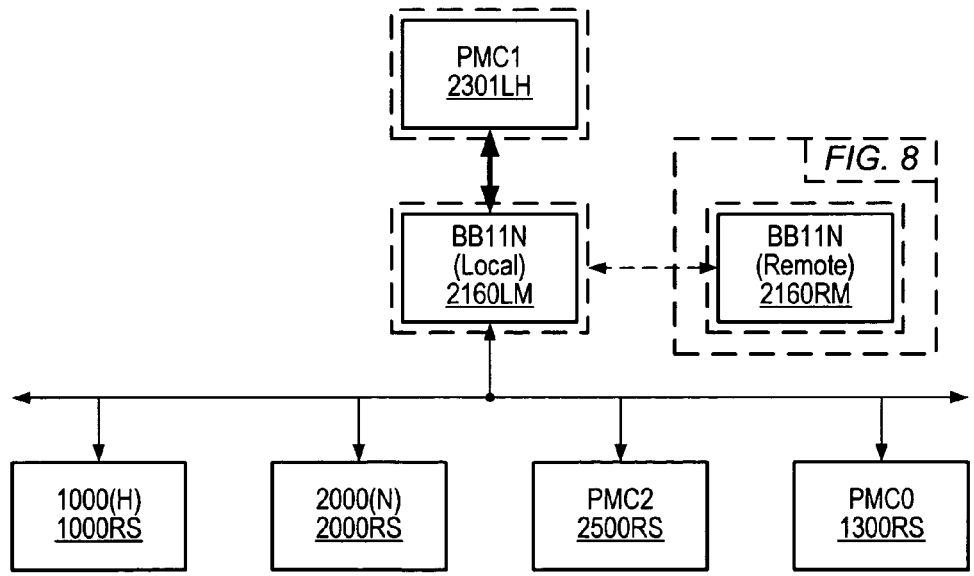
FIG. 10 shows the driver arrangement seen from board 2300 of FIG. 6 in more detail.
Figure 11:
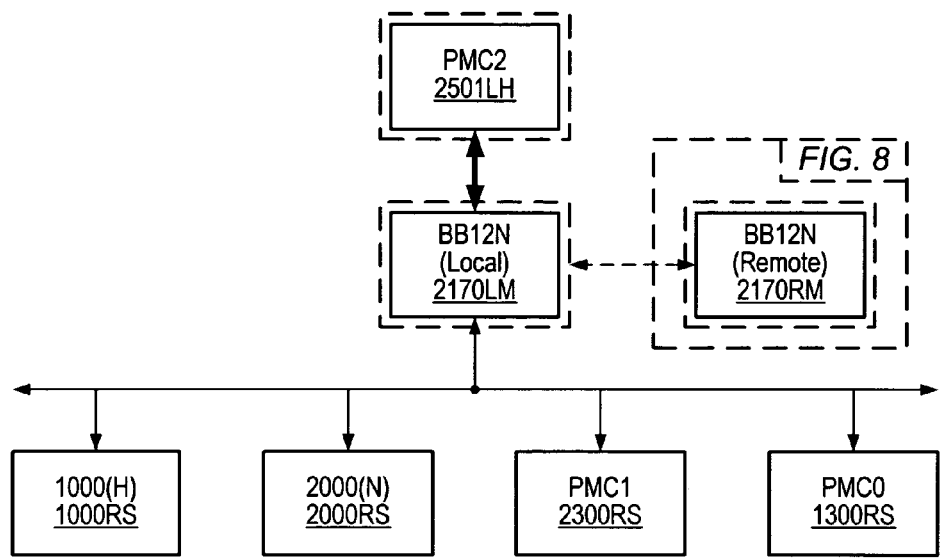
FIG. 11 shows the driver arrangement seen from board 2500 of FIG. 6 in more detail.

In FIG. 8 (board 2110 or NSP for Non System processor Board), the driver instance 2110LH forms a point of connection with:

the remote driver instance 2160RM of the corresponding remote PCI-to-Local bus bridge in connection with the driver instance 2300RS corresponding to PMC1 board,
the remote driver instance 2160RM is coupled with driver instance 2160LM in FIG. 10,
the remote driver instance 2170RM of the corresponding remote PCI-to-Local bus bridge in connection with the driver instance 2500RS corresponding to PMC2 board,
the remote driver instance 2170RM is coupled with driver instance 2170LM in FIG. 11,
the local driver instance 2150LM of the corresponding PCI-to-PCI bridge in connection with the driver instance 1300RS corresponding to PMC0 board and the driver instance 1000RS corresponding to the 1000(H) board,
the local driver instance 2150LM is coupled with driver instance 2150RM in FIG. 7.

In FIG. 9 (board 1300), the local driver instance 1301LH forms a point of connection with the local driver instance 1160LM of the corresponding local PCI-to-Local bus bridge. This local driver instance 1160LM is in connection with the driver instance 1000RS corresponding to local main board 1000(H), the driver instance 2000RS corresponding to remote main board 2000(N), the driver instance 2300RS corresponding to the remote PMC1 board 2300 and the driver instance 2500RS corresponding to the remote PMC2 board 2500. The local driver instance 1160LM is coupled with driver instance 1160RM in FIG. 7.

In FIG. 10 (board 2300), the driver instance 2301LH of the corresponding local processor forms a point of connection with the local driver instance 2160LM of the corresponding local PCI-to-Local bus bridge. This local driver instance 2160LM is in connection with the driver instance 1000RS corresponding to 1000(H), the driver instance 2000RS corresponding to 2000(N), the driver instance 2500RS corresponding to the remote PMC2 board and the driver instance 1300RS corresponding to the remote PMC0 board. The local driver instance 2160LM is coupled with driver instance 2160RM in FIG. 8.

In FIG. 11 (board 2500), the driver instance 2501LH of the corresponding local processor forms a point of connection with the local driver instance 2170LM of the corresponding local PCI-to-Local bus bridge. This local driver instance 2170LM is in connection with the driver instance 1000RS corresponding to 1000(H), the driver instance 2000RS corresponding to 2000(N), the driver instance 2300RS corresponding to the remote PMC1 board and the driver instance 1300RS corresponding to the remote PMC0 board. The local driver instance 2170LM is coupled with driver instance 2170RM in FIG. 8.

The above description of FIGS. 7 through 11 shows how the drivers are organized, and interconnected with each other.

Figure 12:
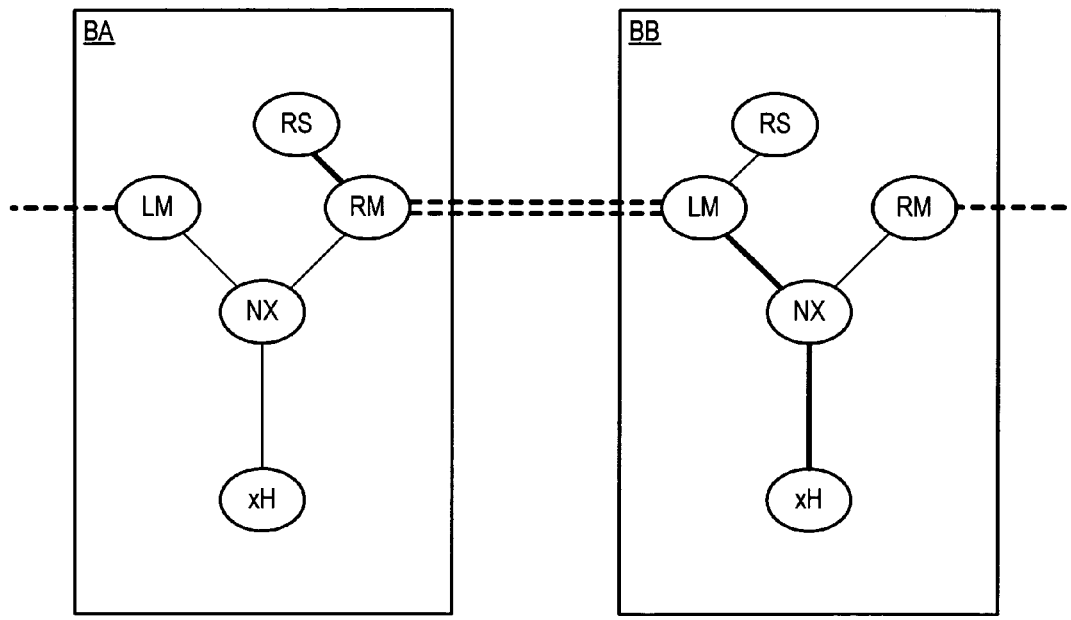
FIG. 12, shows an exemplary interconnection between drivers.

This interconnection is illustrated in a simplified way in FIG. 12, where two boards BA and BB are shown, each comprising a driver of each driver type (designated only from the driver class identifier). Boards BA and BB may be e.g. any pair of the boards 1000, 1300, 2000, 2300, 2500 in FIG. 6. Each board in FIG. 12 has a board level driver xH, a nexus driver NX, an LM driver coupled with an RM driver in a different board, an RM driver coupled with an LM driver in a different board, and an RS driver.

A communication path is open between slave driver RS of board BA and a dedicated portion of the memory in board BB, made available by the board level driver xH of board BB. As illustrated with doubled lines in FIG. 12, the communication path or channel passes through:

an RM driver adjacent to driver RS in board BA,
an LM driver in board BB, paired with the RM driver in board BA,
one or more NX drivers in board BB (optionally),
the xH driver of board BB.

Numerous such paths may be defined in FIGS. 7 through 11, from each RS-suffixed driver to each xH-suffixed driver, bridging from one board to another through a LM-RM pair of drivers. A such pair is denoted "master communication driver". This may be applied to any number of boards, in any interconnection architecture. Preferably, all possible paths are implemented; however, only certain of the paths may be implemented, if desired.

The interfaces between the drivers may be as follows:
between an RS and xM driver: Common bus DDI
between xM, NX and xH drivers: PCI DDI (in the example)+Bus control DDI FIG. 13 shows the general driver functions for each class. The classes are noted as follows: D0 for class xH, D1 for class NX, D2 for class xM and D3 for class RS. Classes D0, D1 and D2 have a selected communication management protocol function, D01, D11 and D21, respectively.

Class D0 or xH (i.e. GH or LH), which is attached to a board, has:
a function D02 for dedicating a portion of the board memory to the driver framework of this invention, and
a function D03 for delivering an interrupt to the processor of that board, in fact a "cross-interrupt" coming from the driver framework of this invention.

In addition, class GH may have a framework configuration arbitration function D04, for the set-up of the intercommunication within the driver framework, and its maintenance.

Class D1 or NX merely passes the bus control protocol messages up and down in a bus-to-bus bridge, as shown in D11.

Class D2 or xM may have the following functions:
at D22 and D23, export the local memory, respectively import the remote memory;
at D24, ensure the remote communication of bus messages;
at D25, ensure the cross-interrupt reception.

Class D3 or RS may have the following functions:
at D31, look for an access to a remote memory; and
at D32, transmit or send a cross interrupt to a remote board.

The interfaces between the drivers may be conveniently defined by using driver classes.

Basically, the xH driver class is intended for creation of driver instances that manages the local memory, more precisely:
provide a local communication DDI to the multiplexer, to access the local memory;
ensure the relationships between different physical communication drivers running on the board, in other words form a point of connection between multiple bus segments, which may be residing on the board or accessible from the board.

It will appear that an xH driver is a pseudo-driver, which does not correspond to a particular device, and may be viewed as embedded in the so called host bus bridge driver, which represents the first bus bridge driver after the processor (local) bus, e.g. bridge 1118 in board 1000 (FIG. 6).

Normally, there should be only one instance of the xH driver class on a given CPU board. All but one of the xH driver instances are LH driver instances; there is one GH driver instance playing a central role within the communication domain, in addition to the basic role of an LH driver instance. Normally, such a GH driver instance is unique in the communication domain (at least at a given time). While the GH role may be assigned arbitrary to any LH driver, in fact, the GH driver is typically running on the host system processor (HSP), since the GH driver role is important.

Now, the NX driver class designates a nexus bus communication driver. Such a driver is typically used on a local bus bridge (e.g., items x150 in FIG. 6). An NX driver instance acts as an auxiliary driver used to connect xM drivers running on a board to the local xH driver (of the same board) via the Bus Control DDI. To this effect, an NX driver instance is connected to the Bus Control DDI provided by its parent communication driver (xH or another NX), and in turn it provides the Bus Control DDI, as required for its child communication drivers (xM or another NX). So, an NX driver does not need to provide any DDI to the multiplexer.

The xM class designates a driver managing a bus-to-bus bridge which connects two CPU boards. The first letter of the class name (R,L) specifies whether the driver instance is remote (R) or local (L) with respect to the device (managed by the driver instance) and the board on which the device resides. The driver class is "local" if the driver is running on the same board on which the device resides, otherwise the driver instance is "remote".

In the example of FIG. 6, comprising HSP board 1000 and NSP board 2000, there are two driver instances for bus bridge 2150 (e.g. an Intel/DEC21554 Drawbridge chip). One driver instance is running on HSP board 1000, while another one is running on NSP board 2000.

Now referring to FIGS. 7 and 8, driver instance 2150RM running on HSP (and managing the primary bridge interface) is remote, while driver instance 2150LM running on NSP (and managing the secondary bridge interface) is local. The xM driver is a nexus. Its main role is to provide a Bus Control communication protocol with peer remote instance. It enables access to the remote memory regions (exported by xH drivers), by creating "remote" device nodes representing xH drivers running on remote CPU boards. Such "remote" device nodes are in fact children of the xM device node. An xM driver does not need to provide any DDIs to the multiplexer, and is an auxiliary driver.

Physical communication drivers running on "remote" nodes are designated by the RS class. The RS class driver provides the Remote Bus Communication DDI to the multiplexer driver allowing the (remote) memory exported on the bus to be accessed by an associated xH driver running on a remote board. It also allows the multiplexer to send cross interrupts to the remote multiplexer.

Summarizing the discussion above, up to six physical communication driver classes may exist within a communication domain. The LH class driver instance represents the local memory. Normally, there is only one LH driver instance per board. There is one LH driver instance which plays a central role in the communication domain. Such a driver belongs to the GH class; basically, the GH class is an extension of the LH class. There is only one GH driver instance per the communication domain. The xM class driver represents a bus-to-bus bridge which connects two CPU boards in the communication domain. The LM driver instance is running locally, i.e., on the board where the bridge resides. The RM driver instance is running remotely, i.e., on the board which arbitrates the external (primary) bus. The NX class driver represents a local bus-to-bus bridge. Finally, the RS class driver represents a CPU board, more exactly, it represents an xH driver instance running on a remote CPU board. Thus, normally, the number of RS driver instances running on a given CPU board is equal to the total number of CPU boards, minus one.

The operation of the drivers will now be described in more detail, beginning with the interface between RS and xM driver classes.

An xM driver provides the common bus driver interface to the child RS drivers. Basically a RS driver is just a normal device driver running on top of a bus driver. Such a driver uses the parent bus operations in order to map both the device (bridge) registers and the (remote) memory exported on the bus. Normally, the RS driver never receives interrupts and therefore never uses interrupt services provided by the parent driver. On the other hand, an RS driver sends cross interrupts to the associated remote board using the bus bridge interface registers. It is preferred to limit the RS driver to the common (bus architecture independent) DDI in order to enable communication between heterogeneous busses. For example, an RS driver for a PCI-to-PCI bridge may run on top of the VME bus. Actually, an RS driver works with a kind of remote (virtual) device. Such a device may have no bus specific attributes on the underlying bus. For example, the configuration header of a PCI-to-PCI bridge may not be visible (accessible) on a remote bus segment. Only bridge interface registers are typically accessible.

Now turning to the interface between xM and xH/NX driver classes, an xM driver is always a child of an NX or xH driver. The NX and xH drivers are bus drivers and therefore they provide the bus DDI to their child xM drivers (e.g., PCI bus DDI). In addition, there is an extra interface between a parent NX/xH and child xM drivers that is related to the physical bus communication layer support. This interface is called the Bus Control interface.

The Bus Control interface provides specific support for the communication protocol across the busses. Basically, the Bus Control interface addresses the following two issues:
 communication domain configuration
 cross interrupts delivery The Bus Control interface is used by the xH and xM drivers to start RS driver instances according to the communication domain topology. The configuration interface is also used to update the physical layer configuration when the hardware configuration is changed due to a hot plug insertion/removal (or a board shutdown/restart).

The Bus Control interface also allows an xH driver to receive cross interrupts sent from remote CPU boards. Basically, when an RS driver instance sends an interrupt to the associated xH driver instance running on a remote board, this interrupt is first received by the xM driver instance which connects the remote board to the communication domain. Using the Bus Control interface, the xM driver sends such an interrupt event upstream (to parent). In this way, interrupt events are propagated up to the xH driver.

Technically, the Bus Control interface is implemented as a separate DDI. An xH driver instance exports the Bus Control DDI via the device registry. An NX driver instance imports the Bus Control DDI provided by its parent (xH or NX) and in turn exports the Bus Control DDI downstream (to children). An xM driver instance imports the Bus Control DDI exported by its parent (NX or xH). Naturally, the device tree database is used by a child driver to detect (in the device registry) the Bus Control interface provided by its parent.

The LM/RM driver instances managing the same bridge device provide a communication path between two CPU boards within the communication domain. This communication path is composed of the following:
 data communication path
 control communication path The LM/RM driver typically manages anon transparent bus bridge. This bridge is connected to the local (secondary) bus and to the remote (primary) bus. It consists of two devices: the remote device is accessible on the primary bus and the local device is accessible on the secondary bus. The LM instance in running locally and it manages the local (secondary) bridge interface. The RM instance is running remotely (on the board arbitrating the primary bus) and it manages the remote (primary) bridge interface.

So, the LM/RM driver dials with two bus segments (primary and secondary). Logically, the bridge device splits the communication domain into two parts: the primary and secondary communication domains. Initially, the LM/RM driver is responsible for configuring the bridge address translation logic in order to enable access from one bus segment to communication resources available on the opposite bus segment. These communication resources are, in fact, memory regions exported by all xH drivers running on CPU boards from the opposite communication domain and also interface registers of bus-to-bus bridges through which these CPU boards are connected to the communication domain. The xM driver is responsible for creating (and managing) RS driver instances in a given (primary or secondary) communication domain for each instance of xH driver running in the opposite communication domain.

The xM driver is also responsible to implement the control communication path in order to forward the Control Bus DDI calls from one side of the communication domain to another. The mechanism used by the xM driver to implement the control communication path is bridge specific and may vary from one driver to another. For example, an xM driver may use I2O FIFOs if the I2O messaging is supported by the underlying bus bridge. Otherwise, mail boxes or scratchpad registers may be used.

Now, an RS driver instance represents a remote CPU board in the communication domain. The RS driver provides the Remote Bus Communication DDI to the multiplexer in order to access the remote board memory exported by the xH driver (running on this remote board) and to send cross interrupts to this xH driver. Interrupts received by the xH driver are then forwarded to the multiplexer.

Note that a cross interrupt cannot be sent directly to an xH driver. An xH driver does not correspond to a concrete (bridge) device but rather to a concrete local memory region. A cross interrupt should be sent to an xM driver first, and then it will be forwarded upstream (i.e., up to the xH driver) using the Bus Control DDI. Therefore, the RS driver is bus bridge specific and it is, in fact, the third driver class (together with LM and RM classes) which must be developed for a given bus bridge device.

Note that RS drivers for the same CPU board (i.e., for the same xH driver instance) are not necessary similar. Actually, a given RS driver type depends on the bus-to-bus bridge device through which this CPU board is connected to the communication sub-domain in which the RS driver instance is running. For example, a given board may be connected to two (external) bus segments through two different (i.e., software incompatible) bridge devices A and B. In this case, the communication domain is logically split on three sub-domains:
 the CPU board itself
 first communication sub-domain connected to the bridge A
 second communication sub-domain connected to the bridge B.

Normally, the RS drivers (representing this CPU board) running in the first sub-domain will be bridge A specific, while the RS drivers (representing this CPU board) running in the second sub-domain will be bridge B specific.

The Bus Control interface will now be considered.

The Bus Control interface is used by physical drivers for two purposes:
 to propagate a cross interrupt received by an xM driver upstream in order to deliver it to the xH driver to configure the communication domain physical drivers according to the communication hardware.

The following basic operations are defined by the Bus Control interface in order to support the dynamic configuration of the communication domain:
host declaration
site declaration
site insertion and connection
site removal and disconnection Most of the Bus Control operations may be considered as asynchronous broadcast messages sent to all xH, xM and NX communication drivers involved into the communication domain. Note that RS drivers are not concerned by the Bus Control protocol.

The following message propagation algorithm is used by the communication drivers in order to implement such a broadcast transmission. If a message is received from the parent, it is sent to all children. If a message is received from a child, it is sent to the parent and to all children except the message transmitter.

The remote Bus Control connection between peer LM and RM driver instances (managing the same bridge device) is always considered as being in the downstream direction from both sides. In other words, the LM driver instance is a child of the RM driver instance and vice versa.

The host declaration message (host_declare) is issued by the GH driver instance. It is a broadcast message which is forwarded to all LH, NX and xM communication drivers using the propagation mechanism described above. The main purpose of this operation is to establish a route between the GH driver and each other (LH, NX, xM) communication driver in the domain. Actually, the host declaration operation is the first Bus Control action which occurs in the communication domain. This action is initiated by the GH driver instance. All LH drivers are waiting for an incoming host declaration message in order to start their own declaration process.

When a host declaration message is received by a driver, it memorizes the direction from which the message is received (host route direction). In addition, the driver forwards this message in all possible directions (upstream and downstream) except the message transmitter.

Note that, if a given driver instance already knows the host route (i.e., it has received the host declaration message) and there is a new child driver which connects to this driver instance later on, the host declaration message is issued to the new driver instance at connection time.

The host declaration message also carries some useful information which is retained by the communication drivers and used later on in the Bus Control protocol:
communication level
communication path The communication level is an integer number. It is initialized to zero by the GH driver and incremented each time the host declaration message is sent over a remote Bus Control interface between LM and RM drivers. Basically, the communication level specifies the host route length, i.e., the distance between a given driver and the GH driver. This distance is measured in the number of CPU boards residing on the host route. Considering the hardware example given above, the communication level is zero on the MCP750 HSP. The level is one on MCPN750 NSP and Force860 PMC plugged into HSP. Finally, the level is two on Force860 PMC plugged into NSP.

The communication path is a NULL terminated ASCII string designating a CPU board global path in the communication domain. Initially, the communication path is set to an empty string by the GH driver. The communication path is then updated each time the host declaration message is sent over a remote Bus Control interface between LM and RM drivers. An xM driver appends its local device path to the communication path string. Therefore, the communication path uniquely identifies a CPU board in the domain because a local device path is supposed to be locally unique.

Once a host declaration message is received by an LH driver instance, the LH driver issues a site declaration request (site_declare). The site declaration operation allows an LH driver to obtain its unique site identifier within the communication domain. The site declaration request is treated by the GH driver instance. The GH driver is responsible for assigning a unique site identifier to each LH driver instance present within the communication domain.

When an LH driver is started, it waits until a host declaration down-call is issued from one of its child drivers. This identifies the host route direction in which a site declaration request has to be sent to. When a site declaration request is received by an NX, xM or other LH driver, it is also forwarded toward in the host route direction. In this way, a site declaration request follows the host route until it finally reaches the GH driver.

Once the GH driver receives a site declaration request it replies to it with a site unique identifier and a site declaration sequence number (SDSQN). The site unique identifier is just an integer value which uniquely identifies the site in the communication domain. SDSQN is also an integer value which is actually a counter of declaration requests received by the GH driver. This counter is initialized to zero and incremented each time a declaration request is received by the GH driver. SDSQN is used in the configuration protocol as described later on. Basically, it provides the configuration process ordering.

Note that the site declaration request carries the LH driver communication path. In other words, the GH driver receives in the site_declare request the unique site communication path assigned to the CPU board being declared. This information may be used by the GH driver in the site unique identifier assignment policy. For example, the GH driver may use the site communication path in order to assign the same site identifier to a CPU board which has been removed from the communication domain and then re-inserted again.

Unlike all other Bus Control operations, the site declaration operation is synchronous. This means that an LH driver that issues the site declaration request is blocked when waiting for the reply. The communication level is typically used by the xM communication drivers in order to tune a time out value when waiting for the site_declare reply message. Usually, the communication level is used as a multiplier for a basic time out value.

Once the site declaration is done, the LH driver notifies all child drivers about the site unique identifier assigned to the CPU board. This notification is done via a site_enable up-call and propagated by child drivers downstream. Note that the site_enable message is local and it never crosses the CPU board boundaries. In other words, the site_enable message is never sent by an xM driver to the remote side. The site unique identifier is just memorized by xM and NX drivers to be used later on. So, the site_enable message does not take a part in the remote Bus Control protocol implemented by an xM driver.

The next step in the LH driver initialization is a site insertion procedure. Such a procedure is initiated by an LH driver that sends a site insertion message downstream, i.e., to all child drivers. Such a site insertion message consists of the following parts:
site identifier
site communication path
SDSQN
interface descriptor
mapping descriptor The site insertion message is a broadcast message and it is propagated to all communication drivers in the domain using the standard propagation mechanism described above.

The interface descriptor identifies the bus bridge device used for the communication protocol. This descriptor is empty initially, and it is set up when the site insertion message is sent the first time to a remote CPU board by an xM driver. The xM driver initializes the interface descriptor according to the underlying bus bridge hardware when a site insertion message with an empty interface descriptor is received from the remote side.

The mapping descriptor consists of two parts:
interface mapping descriptor
memory mapping descriptor The interface mapping descriptor specifies addresses on the current bus which the bridge interface registers are mapped to. Like the interface descriptor, the interface mapping descriptor is initially empty and it is set up together with the interface descriptor by an xM driver, when a site insertion message with an empty interface descriptor is received from the remote side.

The memory mapping descriptor specifies a memory region exported on the bus for the inter-bus communication purposes. It is initially set up by the LH driver initiating the site insertion message and it specifies addresses on the current bus which the local communication memory is mapped to.

Note that the interface descriptor is initialized only once and never updated after that. Unlike the interface descriptor, the mapping descriptor is updated each time the site insertion request is forwarded by a physical communication driver in order to take into account the bus bridge address translation logic. In general, the memory region may be located at different addresses on the primary and secondary busses that a given bus bridge is connected to. So, xM and NX drivers are responsible for keeping the interface and memory mapping addresses up to date (within the message) during the site insertion message propagation.

When a site insertion message is received by an xM or xH driver, the check is made whether the message should be processed or simply ignored. The message is ignored if the driver SDSQN is greater than the message SDSQN. This means that the site insertion message is ignored on a CPU board which has been declared after the CPU board initiated the message.

In other words, the site insertion message issued by a CPU board is processed only on CPU boards which existed at the moment this CPU board was declared.

Together with the site insertion message propagation, xM and xH drivers take some specific actions. Actions taken by the driver are driver class specific and detailed below.

When an xM driver receives a site insertion message from the remote side, it creates a child device node that corresponds to the remote device and starts an appropriate RS driver instance on this node. The device characteristics (e.g., the device and vendor IDs for a PCI device) are specified in the interface descriptor. The bus resources needed to access the remote memory region and bridge interface registers are also specified in the site insertion request (interface/memory mapping descriptors). When creating a remote device node, the xM driver has to specify the local and remote site identifiers as device properties. These properties are then used by the multiplexer upper layer driver. The local site identifier is provided to the xM driver by the LH driver running on the board via the site_enable message. The remote site identifier is specified in the site insertion message. In this way the RS instance is created on a CPU board for a new (remote) LH driver instance running on another CPU board.

When an insertion message is received by an xH driver, the driver sends a site connection message (site_connect) back to the site insertion initiator. The site connection message content is similar to the site insertion message content except that it contains an extra field that specifies the destination site identifier, i.e., identifier of the site initiated the site insertion process. In other words, the site connection message includes both source and destination site identifiers. The source site identifier corresponds to the CPU board that sent the site connection message and the destination site identifier corresponds to the CPU board from which the site insertion request has been sent.

The site connection message is a broadcast message and it is propagated using the standard propagation mechanism described above. The interface and mapping descriptors are initialized and updated similarly. The purpose of the site connection message is to create an RS driver instance associated with a given (remote) xH driver on the newly inserted CPU board. So, when a site connection message is received by an xM driver from the remote side, the driver checks whether the destination site identifier matches the local site identifier. If the check is positive, a device node is created and an RS driver instance is started. Otherwise, the site connection message is simply propagated upstream, and no other action is taken. In this way, an RS driver instance associated with an existing xH driver is created on a newly inserted CPU board.

The CPU board removal mechanism is described below. Note that only a non-surprise removal is considered here.

When a CPU board requests to be removed from the communication domain, a shutdown event is received by the xH driver running on the board. The shutdown event is propagated downstream using an event mechanism implemented by the ChorusOS driver framework. So, a shutdown event is received by xM driver instances running locally on the board. When an xM driver instance receives this event it initiates the site removal procedure described below.

The site removal procedure consists of sending a site removal message to the remote side through the remote Bus Control protocol. The removal message contains the site unique identifier of the CPU board being removed from the communication domain.

The site removal message is a broadcast message and it is propagated using the standard propagation mechanism described above.

When a site removal message is received by an xM driver from the remote side, the driver shuts down the child RS driver instance which matches the site identifier given in the message. So, the purpose of the site removal message is to shut down all RS driver instances associated with the xH driver that is being removed. Note that the site removal message should be propagated upstream (i.e., to the parent) only when an appropriate RS driver instance is destroyed.

When an xH driver receives a site removal message, analogously to the site insertion process, it sends a site disconnection message (site_disconnect) back to the CPU board that initiated the site removal process. The site disconnection message is composed of two site identifiers:

source and destination. The purpose of the site disconnection message is to destroy the RS driver instance (associated with this xH driver) that is running on the CPU board being removed. The site disconnection message is a broadcast message and it is propagated using the standard propagation mechanism described above. On the other hand, it is only taken into account by an xM driver running on the board matching the destination site identifier. On receiving such a site disconnection message, an xM driver shuts down an RS driver instance that matches the source site identifier.

When the last RS child instance goes away, the xM driver performs self shutdown and therefore closes connection to the parent communication driver. In such a way, the shutdown process is propagated upstream and terminated by the xH driver.

It will now be appreciated that this invention offers a computer system, comprising first and second computer boards (1000; 2000), each having a processor (1111; 2111), onboard memory (1115; 2115), an onboard bus (1112; 2112), which is usually a so-called processor bus, and at least one bus-to-bus bridge (1118, 1150; 2118, 2150) for interconnecting the onboard bus (1112; 2112) with an external bus (999). The boards (1000; 2000) have remote slave drivers (1000RS; 2000RS). They also have communication drivers (1110GH, 1150NX, 1160xM; 2110LH, 2150xM, 2160xM), comprising communication management functions, and forming communication chains (or channels) between the remote slave drivers and the onboard memories.

The definition in the above paragraph may also read in several different ways within one of the main boards 1000 and 2000. For example, considering board 2000 and its sub-board 2300:
  the computer system comprises first and second computer boards (2000; 2300), each having a processor, onboard memory, an onboard bus, (all three not shown for board 2300) and at least one bus-to-bus bridge (2118; 2150) for interconnecting the onboard bus with an external bus (2122).
  the boards (2000; 2300) have remote slave drivers (2000RS; 2300RS). They also have communication drivers (2110LH, 2150xM, 2160xM), comprising communication management functions, and forming communication chains (or channels) between the remote slave drivers (2000RS; 2300RS) and the onboard memories (not shown in 2300; 2115).

Each board (1000, 1300, 2000, 2100, 2500) has a host communication driver (1110GH, 1301LH; 2110LH, 2301LH, 2501LH), comprising an onboard memory access function, making a local onboard portion of memory accessible to other boards through the communication drivers.

One of the boards, e.g the first computer board (1000), plays a central role. In that board, the host communication driver (1110GH) further comprises a memory manager function, capable of providing access to a portion of the memory (1115) in the first board (1000) for driver intercommunication. As it will be understood, the driver intercommunication basically comprises a Bus control protocol, with corresponding messages or data.

The host communication driver (1110GH) in the first computer board (1000) may further comprise a driver framework configuration function, in charge of the set-up and follow-up of the driver intercommunication.

The communication drivers may comprise master communication drivers (1160xM; 2150xM, 2160xM), each associated with a bus-to-bus bridge (1160; 2150, 2160), and remote slave communication drivers (RS), each associated with an end-of-chain portion of memory in a remote board, and having a remote memory function for remotely accessing the end-of-chain portion of memory.

A remote slave communication driver (RS) may further have a remote interrupt function, for delivering an interrupt event to a remote board, which may be the same as the remote board comprising the end-of-chain portion of memory which is associated to that RS driver.

Each master communication driver may comprise a local bus-to-bus communication driver (e.g. 1160LM), enabling remote access to a local portion of onboard memory, and a remote bus-to-bus communication driver (e.g. 1160RM), enabling local access to a remote portion of onboard memory. FIGS. 7 through 11 show numerous other examples of such pairs of drivers.

Each master communication driver may further comprise the said communication management function, at least to the extent it is devoted to the remote transmission of bus control messages.

The computer system may further comprise a nexus communication driver (1150NX), capable of managing an onboard bus-to-bus bridge (1150), and of thus providing a local connection between the communication drivers running on that board. This is useful where busses are not "transparent" to the type of messages the drivers have to exchange.

As shown in FIGS. 7 through 11, the communication drivers in a board may be viewed as interconnected in a tree structure, whose root is a host communication driver (xH), and whose leaves are remote slave drivers (RS).

In the above description, the communication drivers are instances of communication driver classes, each having communication management functions in accordance with the selected protocol (except for the RS drivers). More generally, the driver classes may also be viewed as "types" of drivers.

In the embodiment described, the driver classes comprise a local bus-to-bus communication driver class (LM), a remote bus-to-bus communication driver class (RM), board communication driver classes (xH), and a nexus communication driver class (NX), all having the communication management functions, plus the remote slave driver class (RS).

A specific embodiment of this invention is described in Exhibit A, with reference to the exemplary interfaces as defined by the C-type code extracts shown in exhibit B.

Although the above description involves PCI busses, this invention may extend to numerous other types of I/O busses. Also, while some portions of the above description refer to platforms based on the ChorusOS operating system, this invention may be applied to other operating systems as well.

Exhibit A—Comments on the Example (Code Extracts)

EA-1

The local Bus Control DDI is provided by each xH and NX driver instance running on a CPU board.

The character string "buscom-ctl" (alias BUSCOM_CTL_CLASS) names the local Bus Control device class. A pointer to the BusComCtlOps structure is exported by the driver via the svDeviceRegister microkernel call. A driver client invokes the svDeviceLookup and svDeviceEntry microkernel calls in order to obtain a pointer to the device service routines vector. Once the pointer is obtained, the driver client is able to invoke the driver service routines via indirect function calls.

The local Bus Control DDI is a multi-client DDI. Multiple child communication drivers may reside on top of an xH or NX communication driver. So, the device registry allows for multiple lookups being done on the same driver instance.

All methods defined by the BusComCtlOps structure must be called in the DKI thread context. The methods are shown in EB-101.

The version field specifies the maximum local Bus Control DDI version number supported by the driver. The version number is incremented each time one of the local Bus Control DDI structures is extended in order to include new service routines. In other words, a new symbol is added to the BusComCtlVersion enumeration each time the API is extended in this way. A driver client specifies a minimum DDI version number required by the client when calling svDeviceLookup. The svDeviceLookup routine does not allow a client to look up a driver instance if the DDI version number provided by the driver is less than the DDI version number required by the client.

A client that is aware of DDI extensions may still specify a minimum DDI version when looking for a device in the registry. Once a device is successfully found, the client may examine the version field in order to take advantage of extended DDI features which may be provided by the device driver.

The open method is the first call a child must make to the parent driver. The open call is used to establish a connection to the driver. It enables subsequent invocation of all other methods defined by the BusComCtlOps structure.

The id input argument specifies a given communication device driver instance. It is given by the device registry entry. The up calls input argument specifies the child driver up call methods. Because the Bus Control interface is bi-directional, there is a significant intersection between the BusComCtlUpCalls and BusComCtlOps structures. The only up call specific methods are intr_attach, intr_detach and site_enable. The only down call specific methods are open, close and site_shutdown.

All methods specified by the BusComCtlUpCalls structure must be called in the DKI thread context.

This is shown in EB-102.

The cookie input argument is passed back to the client driver each time an up call method is invoked.

Upon successful completion, the parent driver returns K_OK and passes back to the child the connection identifier via the cid output argument. The connection identifier must be passed back to the parent driver in subsequent invocations of all other methods defined by BusComCtlOps. The K_ENOMEM error code is returned, if there are not enough memory resources to establish a connection. In this case, the cid output argument is not modified.

The close method is used to close the connection with the parent driver. This call must be the last call made to the driver. The cid input argument specifies a given connection to the communication driver instance. It is given by the open routine.

The site_declare operation is used to declare a new site connected to the communication domain. The site_declare request is initiated by an LH driver instance running on the site being declared. Then, using the site_declare up and down calls, the request is propagated by LH/NX/xM communication drivers up to the GH driver instance which handles the request and replies to it. The request always moves in the host route direction, established by the host_declare operation. The replay moves in the opposite direction in order to return to the site_declare initiator. The main purpose of the site_declare operation is to assign a unique identifier to the site being declared. Actually, this is the first action (with respect to the Bus Control interface) taken by an LH driver at initialization time. Usually, an LH driver initiates the site_declare operation as soon as one of its child drivers invokes the host_declare down call in order to specify the host route direction.

Note that, the site_declare operation is synchronous. Therefore, the communication driver is blocked awaiting for the site_declare reply. Actually, site_declare is the only synchronous operation specified by the Bus Control interface. All other operations are actually asynchronous broadcast messages.

The first argument is down/up call specific but, in both cases, it identifies a given child-to-parent connection. The cookie up call argument is given by the child at open time. The cid down call argument is returned to child by open.

All other arguments are identical for both down and up calls. Note that the cpath, cplen and site input argument are set up by the initiator LH driver and they are never changed by the intermediate drivers that forward the site_declare request. Similarly, the site and seq output arguments are set up by the GH driver and they are never changed by the intermediate drivers that forward the side_declare reply.

The cpath and cplen input arguments specify the communication path of the site being declared. The communication path is a NULL terminated ASCII string which uniquely identifies the site within the communication domain. The communication path is given to the driver by the host_declare call. Basically, it is a hint for the GH driver which may be used in the policy of site identifier assignment.

The site argument is both input and output. From one hand, the site_declare initiator may specify a suggested identifier to be assigned to the site. For example, a geographical slot number may be used on the cPCI bus as a suggested site identifier. On the other hand, the site argument is set up by the GH driver to the unique identifier really assigned to this site. Note that the GH driver may not satisfy the LH driver suggestion. This typically happens when the suggested site identifier is already assigned to another site. The suggested site identifier must be in the range 1 to 0xffffffff. If the site_declare initiator has no specific suggestion on the site identifier, the site argument must be set to 0 (BUSCOM_SITE_INVALID).

The seq output argument specifies the site declaration sequence number (SDSQN). The SDSQN value should be retained by the site_declare initiator in order to be used later on. Basically, because the site declaration operation is synchronous, SDSQN provides a kind of ordering for all future asynchronous actions taken by communication drivers at initialization time.

Upon successful completion, the site_declare routine returns K_OK and passes back to the caller, the assigned site identifier and SDSQN.

The K_EINVAL error code is returned, if the communication driver does not reside on the host route. The K_ENOMEM error code is returned, if there are not enough memory resources to process the site declaration request. The K_ETIMEOUT error code is returned, if a time out has occurred when waiting for a reply from a remote site. The K_EFULL error code is returned, if there are no more available site identifiers in the domain. In case of error, the site and seq output arguments are not modified.

The site_insertion operation is used to establish forward connections between a newly declared site and all other sites existing within the communication domain. The site_insertion message is initiated by the LH driver instance running on a newly declared site. Then, using the site_insertion up and down calls, the request is broadcasted by xH/NX/xM communication drivers across the communication domain. The main purpose of the site_insertion operation is to create, on each site, a RS driver instance representing the LH driver instance that initiated this site_insertion message. This allows a remote site to access local memory exported by this LH driver and to send cross interrupts to it. In such a way the site_insertion initiator establishes connection to each other site within the communication domain. In addition, receiving a site_insertion message, an xH driver initiates a site_connect message toward the site_insertion initiator.

The main purpose of the site_connect operation is to create, on the site_insertion initiator site, an RS driver instance representing the LH driver instance that initiated this site_connect message. This allows the site_insertion initiator site to access local memory exported by this LH driver and to send cross interrupts to it. In such a way a connection is established to the site_insertion initiator from each other site within the communication domain. So, the site_connect message is an xH driver reply on an incoming site_insertion message. Usually, the site_insertion message is initiated by an LH driver at initialization time once the site declaration operation is successfully completed.

The first argument is down/up call specific but, in both cases, it identifies a given child-to-parent connection. The cookie up call argument is given by the child at open time. The cid down call argument is returned to child by open. All other arguments are identical for both down and up calls. The seq argument specifies the SDSQN of the site_insertion initiator. It is given to the driver by the site_declare operation. This argument is set up by the site_insertion initiator and it is never changed by the intermediate communication drivers that forward the message. Note that when an incoming site_insertion message is received by a communication driver, it must compare the seq arument value with the SDSQN assigned to the driver. In case the driver SDSQN is greater than the seq value, the site_insertion message must be ignored. This means that the site_insertion message is not processed on a site which has been declared later than the site_insertion initiator. Indeed, such a site will initiate its own site_insertion operation which will then be processed on the site from which this (ignored) site_insertion message has been sent.

The src argument specifies the site_insertion initiator identifier. It is given to the driver by the site_declare operation. This argument is set up by the site_insertion initiator and it is never changed by the intermediate communication drivers that forward the message. The cpath and cplen arguments specify the communication path of the site_insertion initiator. The communication path is a NULL terminated ASCII string which uniquely identifies the site within the communication domain. The communication path is given to the driver by the host_declare operation. These arguments are set up by the site_insertion initiator and they are never changed by the intermediate communication drivers that forward the message. The dev argument specifies the bus bridge device (interface) which connects the site_insertion initiator to the communication domain. Note that this argument is set to NULL by the LH driver that initiated the site_insertion operation, because the LH driver cannot identify the interfaces through which the site is connected to the domain. The bus bridge device is identified when the site_insertion message leaves the site_insertion initiator site, in order to go to a remote site. Therefore, when an xM driver receives a site_insertion message from the remote site with a NULL interface descriptor, it sets up the descriptor according to the underlying bus bridge device hardware. Once the interface descriptor is set up, it is never changed by the intermediate communication drivers that forward the message.

This is shown in EB-103.

The interface descriptor is used by an xM driver in order to identify the RS driver type which should be launched to communicate with the site_insertion initiator. Basically, when an xM driver creates an RS device node, it attaches the interface descriptor to the node as the "dev-info" property (alias BUSCOM_RS_PROP_DEV_INFO). This allows an RS driver to examine such a property at bind time in order to detect whether the bridge hardware is supported by the RS driver.

The map argument specifies addresses on the current bus segment which the exported memory (memory mapping) and bus bridge registers (interface mapping) are mapped to.

This is shown in EB-104.

Obviously, the interface mapping is invalid if the interface descriptor is NULL. So, the site_insertion initiator sets up the memory mapping only. The interface mapping is set up by an xM driver together with the interface descriptor. Note that the mapping descriptor must be updated by any intermediate communication driver forwarding the message, in order to take into account the underlying bus bridge translation logic. In general, a region may be located at different addresses on the primary and secondary busses that a given bus bridge is connected to. So, xM and NX communication drivers are responsible for keeping the interface and mapping descriptors up to date during the site_insertion message propagation.

The mapping descriptor is used by an xM driver in order to specify bus resources for an RS driver launched to communicate with the site_insertion initiator. Basically, when an xM driver creates an RS device node, it attaches the "io-regs" and "mem-rgn" properties to the node. The properties values (i.e., space, base address, size) are set up according to the mapping descriptor of the site_insertion message.

The site_connect operation is used to establish a backward connection to the site_insertion initiator. Basically, the site_connect message is the reply of an xH driver instance to an incoming site_insertion message. Like all other bus communication operation (except site_declare), site_connect is an asynchronous broadcast message. It is initiated by an xH driver instance and then propagated by xH/NX/xM communication drivers across the communication domain using the site_connect up and down calls.

The site_connect arguments are similar to the site insertion ones except the dst extra argument which designates the destination site, i.e., the site initiated the site_insertion message. Despite the broadcast nature of the site_connect message, it is only processed on the destination site. Therefore, receiving an incoming site_connect message, a communication driver checks whether the dst site matches the driver local site. In case of mismatch, the message is simply forwarded to parent/child drivers using the propagation mechanism described above, and no other action is taken. Note however, that a communication driver that forwards a site_connect message must update the interface (if needed) and mapping descriptors in the same way as for the site_insertion message.

An incoming site_connect message is only taken into account by an xM driver instance when it is received from the remote site and the destination site matches the local site. In this case, analogous to the site_insertion operation, the xM driver creates a child device node and launches an RS driver instance on this node. Unlike the site_insertion operation, xH communication drivers does not reply to the site_connect message.

The site_removal operation is used to close forward connections to a given site from all other sites within the communication domain. Like all other bus communication operations (except site_declare), site_removal is an asynchronous broadcast message. It is initiated by an xM driver instance and then propagated by xH/NX/xM communication drivers across the communication domain using the site_removal up and down calls.

Usually, the site_removal operation is used at site shutdown time. Note that the site shutdown is always initiated by the LH driver instance which sends a shutdown event to all child drivers. Such a shutdown event is propagated downstream by communication drivers running on this board using the standard driver framework mechanism. Finally, such a shutdown event is received by an xM driver instance which sends a site_removal message to its remote peer xM driver instance.

The first argument is down/up call specific but, in both cases, it identifies a given child-to-parent connection. The cookie up call argument is given by the child at open time. The cid down call argument is returned to the child by open. The src argument specifies the site identifier of the site_removal initiator. When an xM driver receives an incoming site_removal message from the remote site, it must shut down an RS driver instance that matches the src site identifier and must delete associated device node. Only following this, the driver can forward the site_removal message upstream.

When an xH driver receives an incoming site_removal message, analogous to the site_insertion operation, it replies with a site_disconnect message sent back to the site_removal initiator. The main purpose of the site_disconnect operation is to destroy the RS driver instance running on the site_removal initiator board, that represents this xH driver instance.

The site_disconnect operation is used to close a backward connection to the site_removal initiator. Basically, the site_disconnect message is a reply of an xH driver instance on an incoming site_removal message. Like all other bus communication operations (except site_declare), site_disconnect is an asynchronous broadcast message. It is initiated by an xH driver instance and then propagated by xH/NX/xM communication drivers across the communication domain using the site_disconnect up and down calls.

The site_disconnect arguments are similar to the site_removal ones except for the dst extra argument which designates the destination site, i.e., the site initiated the site_removal message. Despite the broadcast nature of the site_disconnect message, it is only processed on the destination site. So, on receiving an incoming site_disconnect message, a communication driver checks whether the dst site matches the driver local site. In the case of a mismatch, the message is simply forwarded to parent/child drivers using the propagation mechanism described above and no other action is taken.

An incoming site_disconnect message is only taken into account by an xM driver instance when it is received from the remote site and the destination site matches the local site. In this case, the xM driver must shut down a RS driver instance that matches the src site identifier and must delete the associated device node. When the last RS child driver goes away, the xM driver performs self shutdown and closes connection to the parent communication driver. In this way, the shutdown process is propagated upstream, and finally terminated by the LH driver instance.

The host_declare operation is used to establish a host route between the GH driver instance and all LH driver instances within the communication domain. The host route is used to implement the site_declare operation. Like all other bus communication operations (except site_declare), host_declare is an asynchronous broadcast message. It is initiated by the GH driver instance and then propagated by xH/NX/xM communication drivers across the communication domain using the host_declare up and down calls.

Basically, host_declare is the first operation (with respect to the Bus Control interface) made by the GH driver instance at initialization time. Note that the GH driver neither initiates site_declare nor site_insertion operations. Indeed, the site_declare operation is always processed by the GH driver. Therefore, the GH driver is able to assign a site identifier to itself. Naturally, the SDSQN is always set to zero for the GH driver. The GH driver then increments SDSQN each time it processes a new site_declare request. So, the GH driver has the minimal SDSQN in the domain and therefore it is useless to send the GH site_insertion message because such a message will be ignored by all communication drivers. Instead, the GH driver replies with a site_connect message on each incoming site_insertion message.

The first argument of host_declare is down/up call specific but, in both cases, it identifies a given child-to-parent connection. The cookie up call argument is given by the child at open time. The cid down call argument is returned to the child by open. All other arguments are identical for both down and up calls. The level argument specifies a distance between the GH driver and a given communication driver. Such a distance is measured in number of sites (i.e., CPU boards). The GH driver initially sets the level to zero. The level is incremented each time the host_declare message is forwarded by an xM driver instance to its remote peer xM partner. The communication level is a hint for a communication driver. It might be used, for example, in order to tune a time out period used by an xM driver to wait for the site declare reply from the remote site. The cpath and cplen arguments specify the current communication path. The communication path is a NULL terminated ASCII string which uniquely identifies the site within the communication domain. Such a path is dynamically constructed by xM communication drivers during the host_declare message propagation process. The communication path is initially set to an empty string by the GH driver. Then, the local path of the underlying bus bridge device is appended to the string each time the host_declare message is forwarded by an xM driver instance to its remote peer xM partner. Therefore, the communication path uniquely identifies a site within the domain because a local device path is assumed to be locally unique.

Note that any communication driver must support a deferred propagation of the host_declare message. This means that once the host_declare message is received by a communication driver, it must retain all needed information in order to be able to re-send this message later on (i.e., in a deferred way). Such a deferred host_declare message re-send must take place each time a new child communication driver is connected (locally or remotely) to the driver.

The site_shutdown down call is used to notify the LH driver of a site shutdown request, detected by a communication driver. Typically, a shutdown request may be initially received by an LM driver instance from its remote peer RM partner. For example, it may be a board removal request detected on the cPCI bus by a RM driver instance (running on the system controller board) and transmitted (through the remote Bus Control interface) to the peer LM partner. On receiving such a remote shutdown request, the LM driver notifies its parent communication driver of the invocation of the site_shutdown routine. In the same way, the parent driver notifies its parent and so on. Finally, the shutdown request reaches the LH driver instance which initiates the site shutdown process as described above (see site_removal).

The cid input argument specifies a given connection to the driver. It is returned by open.

The site_enable up call is used to put local communication drivers in a fully operational state. The site_enable operation is initiated by the xH driver once the site_declaration operation is successfully completed. Then, the site_enable operation is propagated downstream by NX communication drivers up to the leave xM communication drivers. Note that this operation is local and it does not take a part in the remote Bus Control protocol. On receiving a site enable_call, the xM driver becomes fully operational. Now, the driver is able to process site_insertion and site_connection messages. The site_enable call specifies, to the driver, the unique identifier and SDSQN assigned to the local site.

The cookie argument specifies a given connection to the driver. It is given by child at open time. The site argument specifies the unique identifier assigned to the local site. The seq argument specifies SDSQN assigned to the local site. The site and seq arguments are set up by the xH driver and they are never changed by the intermediate NX communication drivers that forward the site_enable call downstream. In an analogous way to the host_declare deferred propagation, xH and NX communication drivers must support the site_enable deferred propagation mechanism. In case a new child driver is connected to a fully operational (i.e., enabled) xH or NX driver instance, the driver must immediately issue the site_enable call to this child driver in order to put it in a fully operational state.

The intr_attach method connects a given handler to a given (virtual) cross interrupt source. The cookie input argument specifies a given child communication driver. It is provided at open time. The intr input argument is an integer value that specifies a given (virtual) cross interrupt source. Note that if a given interrupt number exceeds the number of physical cross interrupts supported by the hardware, the interrupt handler is connected to the last available physical cross interrupt. Note also that multiple handlers may be attached to the same interrupt source.

The intr_handler input argument specifies an interrupt handler invoked by the child communication driver when a cross interrupt is received. The intr_cookie input argument specifies a cookie that is passed back to the interrupt handler.

This is shown in EB-105.

Upon successful completion, the child driver returns K_OK and passes back to the parent the interrupt identifier through the intr_id output argument. The intr_id argument is opaque for the parent. It must be passed back to the child driver as an argument in a subsequent invocation of the intr_detach routine.

The K_ENOMEM error code is returned, if the system is out of memory resources. In case of error, the intr_id output argument is not modified. When the interrupt handler is invoked, the child driver prevents re-entry to the interrupt handler. An interrupt handler must return a value specified by the BusComIntrStatus type, as shown in EB-126.

An interrupt handler must return BUSCOM_INTR_UNCLAIMED if the interrupt is unclaimed, i.e., there is no useful work done in the interrupt handler.

An interrupt handler must return BUSCOM_INTR_CLAIMED if the interrupt has been claimed, i.e., there was a useful work done in the interrupt handler.

The intr_detach up call disconnects the interrupt handler previously connected by intr_attach. The intr_id input argument specifies the interrupt handler being disconnected. It is returned by intr_attach.

EA-2

This section describes a message based interface used to provide a remote Bus Control communication between peer LM and RM driver instances running on different CPU boards but managing the same bus-to-bus bridge device.

The messages described below are basically equivalent to the local Bus Control interface defined in the previous section. In fact, these messages are just used to make the Bus Control DDI distributed across the communication domain.

Note that this section does not specify which hardware mechanism should be used to transfer a message from one site to another. Such a mechanism is LM/RM driver implementation specific and generally depends on the underlying hardware. For example, if a bridge supports I2O messaging, I2O FIFO's may be used for the Bus Control message transfer. Otherwise, scratchpad registers may be used for this purpose.

Each message has a standard header defined by the BusComMsg structure shown in EB-201.

The size field specifies the message size including the BusComMsg header. The type field specifies the message type as listed above. Receiving an incoming message the communication driver should cast it to an appropriate message structure according to the message type. Message specific structures are described in the rest of the document.

The BusComMsg_site_declare structure defines the site_declare request layout. Note that because the site_declare operation is synchronous, the Bus Control interface also specifies the BusComMsg_site_declare_ack structure which defines the site_declare reply layout. This is shown in EB-202.

The token field is used to associate the site_declare acknowledgment received from a remote site to the site_declare request issued by the local site. The token is set up by the local site when a site_declare request is sent. A remote site copies the token to the site_declare acknowledgment message when replying to the site_declare request. Basically, the token allows a communication driver to implement the site_declare synchronous call via two asynchronous messages: the site_declare request and site_declare acknowledgment. The site field of the site_declare request specifies a suggested site unique identifier. The path field specifies the start location of the communication path. The path size must be calculated using the total message size given by the message header.

The res field of the site_declare reply specifies the site_declare operation result. If the operation is failed, i.e., the res value is not K_OK, the site and seq fileds are meaningless. The site field of the site_declare reply specifies the site unique identifier assigned to the site_declare initiator. The seq field of the site_declare reply specifies SDSQN that is assigned to the site_declare initiator. The BusComMsg_site_insertion structure defines the site_insertion message layout, as shown in EB-203.

The seq field specifies SDSQN assigned to the site_insertion initiator. The src field specifies the unique site identifier assigned to the site_insertion initiator. The dev field specifies the interface (bus bridge device) descriptor. The map field specifies the interface and memory mappings on the current bus segment. The path field specifies the start location of the communication path. The path size has to be calculated using the total message size given by the message header.

The BusComMsg_site_connect structure defines the site_connect message layout, as shown in EB-204.

The dst field specifies the unique identifier of the destination site, i.e., the site_insertion initiator. The src field specifies the unique identifier of the source site, i.e., the site_connect initiator. The dev field specifies the interface (bus bridge device) descriptor. The map field specifies the interface and memory mappings on the current bus segment. The path field specifies the start location of the communication path. The path size must be calculated using the total message size given by the message header.

The BusComMsg_site_removal structure defines the site_removal message layout, as shown in EB-205. The src field specifies the unique site identifier of the site_removal initiator.

The BusComMsg_site_disconnect structure defines the site_disconnect message layout, as shown in EB-206.

The dst field specifies the unique identifier of the destination site, i.e., the site_removal initiator. The src field specifies the unique identifier of the source site, i.e., the site_disconnect initiator.

The BusComMsg_host_declare structure defines the host_declare message layout, as shown in EB-207.

The level field specifies the current communication level. The path field specifies the start location of the current communication path. The path size has to be calculated using the total message size given by the message header.

The BusComMsg_site_shutdown structure defines the site_shutdown request layout, as shown in EB-208. Such a message is sent to the remote side in order to request the site shutdown.

The BusComMsg_site_shutdown_ack structure defines the site_shutdown acknowledgment layout. As shown in EB-209. Such a message is sent to the site_shutdown initiator in order to notify him that the site shutdown process has been entered in a final phase.

For example, on the cPCI bus, a hot swap removal event is received by a RM driver instance running on the system controller board. Receiving such an event, the RM driver sends the site_shutdown request to the peer LM driver instance. Receiving such a message, the LM driver initiates the board shutdown process. At final phase of the board shutdown, the LM driver sends back to the peer RM driver instance the site_shutdown acknowledgment message.

EA-3

This section specifies some generic properties related to a device tree node representing a bus communication device. The section is divided onto three subsections which address the xH, GH and RS specific properties respectively. Note that xH device node is typically created statically in the device tree. Therefore, a system administrator is typically responsible for configuring xH drivers via device node properties. On the other hand, RS device nodes are typically created dynamically by the xM communication drivers that process site_insertion and site_connect messages. So, an xM driver developer is responsible for attaching the appropriate properties to a RS node at node creation time.

Concerning the xH Node Properties, the "site" property (alias BUSCOM_LH_PROP_SITE) specifies a suggested site identifier to be assigned to an xH driver. The property value type is BusComSite. This property is optional.

An LH driver uses the property value in the site_declare operation in order to specify a suggested site identifier. If property is not present, the BUSCOM_SITE_INVALID constant (0x0) is used in the site_declare operation. This means that the driver has no suggestion for the site identifier.

A GH driver uses the property value as the unique identifier assigned to the local site. If property is not present or the property value is invalid, a minimal site identifier assigned to the domain is used.

The "mem-size" property (alias BUSCOM_LH_MEM_SIZE) specifies the memory size which should be allocated by an xH driver for communication purposes. The property value type is BusComSize. This property is optional. If the property is not present, driver uses a default value which is driver implementation specific.

Concerning the GH Node Properties, the "host" property (alias BUSCOM_GH_CLASS) attached to a node specifies that an xH driver instance running on the node should act as the GH driver. The property has no value.

The "site-min" (alias BUSCOM_GH_PROP_SITE_MIN) and "site-max" (alias BUSCOM_GH_PROP_SITE_MAX) properties specify a range of unique site identifiers assigned to the communication domain. Both properties use BusComSite as the value type. Both properties are optional. The BUSCOM_DEF_SITE_MIN constant (0x1) is used as the default value for the BUSCOM_GH_PROP_SITE_MIN property, if the property is not present in the node. The BUSCOM_DEF_SITE_MAX constant (0xffffffff) is used as the default value for the BUSCOM_GH_PROP_SITE_MAX property, if the property is not present in the node.

Concerning the RS Node Properties, the "mem-size" peoperty (alias BUSCOM_RS_MEM_SIZE) specifies a memory size which is allocated on the remote site for communication purposes. The property value type is BusComSize. This property is mandatory.

The "dev-info" property (alias BUSCOM_RS_PROP_DEV_INFO) specifies an interface (i.e., bus bridge device) used to communicate to the remote site. The property value type is bus architecture specific. This property is mandatory.

EA-4

Unlike the Bus Control DDI which is a private interface for the physical communication layer, there are two public DDIs provided by the physical communication layer to the upper (logical) communication layer:

local bus communication DDI remote bus communication DDI

The local BusCom DDI is provided by an xH driver instance running on the local site.

First of all, the local BusCom driver is responsible for allocating a system memory region for communication purposes and for making it accessible on all remote sites involved in the communication domain. In addition, the local communication driver allows a client to receive a cross interrupt sent from any remote site involved in the communication domain. The character string "buscom-loc" (alias BUSCOM_LOCAL_CLASS) names the local BusCom device class. A pointer to the BusComLocOps structure is exported by the driver via the svDeviceRegister microkernel call. A driver client invokes the svDeviceLookup and svDeviceEntry microkernel calls in order to obtain a pointer to the device service routines vector. Once the pointer is obtained, the driver client is able to invoke the driver service routines via indirect function calls. A local BusCom driver is mono-client device driver. The device registry prevents multiple lookups being done on the same driver instance.

All methods defined by the BusComLocOps structure, as shown in EB-211, must be called in the DKI thread context.

The version field specifies the maximum local BusCom DDI version number supported by the driver. The version number is incremented each time one of the local BusCom DDI structures is extended in order to include new service routines. In other words, a new symbol is added to the BusComLocVersion enum each time the API is extended in this way. A driver client specifies a minimum DDI version number required by the client when calling svDeviceLookup. The svDeviceLookup routine does not allow a client to look up a driver instance if the DDI version number supported by the driver is less than the DDI version number required by the client. A client that is aware of DDI extensions may still specify a minimum DDI version when looking for a device in the registry. Once a device is successfully found, the client may examine the version field in order to take advantage of the extended DDI features which may be supported by the device driver.

The open method is the first call a client must make to a local BusCom device driver. The open call is used to establish a connection to the driver. It enables subsequent invocation of the intr_attach, intr_detach, and close routines.

The id input argument specifies a given local BusCom device driver instance. It is provided by the device registry entry. Upon successful completion, the local BusCom driver returns K_OK and passes the communication resources (back to the client), through the config output argument. The BusComConfig structure specifies the memory region allocated for the inter-bus communication, as shown in EB-212.

The mem_base field specifies the region base address in the supervisor virtual address space. The mem_size specifies the region size in bytes. This region is located in the local system memory and it is also accessible (through a bus) from any remote site in the communication domain.

Note that the memory region is zeroed by the local BusCom driver except the BusComHeader structure (shown in EB-213) located at the beginning of the region. The BusComHeader structure is initialized by the local BusCom driver in the following way. Each byte in the lborder field contains its address, i.e., byte 0 is 0, byte 1 is 1 and so forth. The rborder field is initialized to the BYTE_ORDER_LITTLE constant. The BusComHeader structure is typically used on a remote site in order to detect the memory byte order.

The local BusCom driver returns K_ENOMEM if the system is out of memory resources. In this case, the config output argument is not modified.

The intr_attach method connects a given client specific handler to a given (virtual) cross interrupt source.

The id input argument specifies a given local BusCom device driver instance. It is provided by the device registry entry. The intr input argument is an integer value that specifies a given (virtual) cross interrupt source. Note that if a given interrupt number exceeds the number of physical cross interrupts supported by the hardware, the interrupt handler is connected to the last available physical cross interrupt. Note also that multiple handlers may be attached to the same interrupt source. The intr_handler input argument specifies a client specific interrupt handler invoked by the local BusCom driver when a cross interrupt is received. The intr_cookie input argument specifies a cookie being passed back to the interrupt handler, as shown in EB-214.

Upon successful completion, the local BusCom driver returns K_OK and passes the interrupt identifier (back to the client) through the intr_id output argument. The intr_id argument is opaque for the client. It must be passed back to the local BusCom driver as an argument in a subsequent invocation of the intr_detach service routine. When the interrupt handler is invoked, the local BusCom driver prevents re-entry to the interrupt handler.

An interrupt handler must return a value specified by the BusComIntrStatus type, shown at EB-215.

An interrupt handler must return BUSCOM_INTR_UNCLAIMED if the interrupt is unclaimed, i.e., there is no useful work done in the interrupt handler. An interrupt handler must return BUSCOM_INTR_CLAIMED if the interrupt has been claimed, i.e., there was a useful work done in the interrupt handler.

The local BusCom driver returns K_ENOMEM if the system is out of memory resources. In this case, the intr_id output argument is not altered.

The intr_detach method disconnects the interrupt handler previously connected by intr_attach. The intr_id input argument specifies the interrupt handler being disconnected. It is returned by intr_attach.

The close method is used to close the connection to a local BusCom driver. This call must be the last call made to the local BusCom driver. The client is responsible for issuing intr_detach for each attached interrupt handler prior to calling the close routine. The id input argument specifies a given local BusCom device driver instance. It is given by the device registry entry.

EA-5

The remote bus communication DDI is provided by each RS driver instance running on the local site and representing a remote site involved in the communication domain.

First of all, the remote BusCom driver is responsible for mapping a shared memory region allocated on the associated remote site into the supervisor address space in order to make it available for the communication protocol. In addition, the remote BusCom driver allows a client to send a cross interrupt to the associated remote site.

Such a cross interrupt will be received by an LH (or GH) driver running on this remote site. This will result in the interrupt handlers attached to this cross interrupt source being invoked. The character string "buscom-rem" (alias BUSCOM_REMOTE_CLASS) names the remote BusCom device class. A pointer to the BusComRemOps structure (shown in EB-216) is exported by the driver via the svDeviceRegister microkernel call. A driver client invokes the svDeviceLookup and svDeviceEntry microkernel calls in order to obtain a pointer to the device service routines vector. Once the pointer is obtained, the driver client is able to invoke the driver service routines via indirect function calls.

A remote BusCom driver is mono-client device driver. The device registry prevents multiple lookups being done on the same driver instance. The open and close methods defined by the BusComRemOps structure must be called in the DKI thread context. The intr_trigger method may be called at interrupt level.

The version field specifies the maximum remote BusCom DDI version number supported by the driver. The version number is incremented each time one of the remote BusCom DDI structures is extended in order to include new service routines. In other words, a new symbol is added to the BusComRemVersion enum each time the API is extended in this way.

A driver client specifies a minimal DDI version number required by the client when calling svDeviceLookup. The svDeviceLookup routine does not allow a client to look up a driver instance if the DDI version number supported by the driver is less than the DDI version number required by the client.

A client that is aware of DDI extensions may still specify a minimum DDI version when looking for a device in the registry. Once a device is successfully found, the client may examine the version field in order to take advantage of extended DDI features which may be supported by the device driver.

In the following description, a local site means the site on which the remote BusCom driver instance is running while a remote site means the remote site which is represented by this remote BusCom driver instance.

The open method is the first call a client must make to a remote BusCom device driver. The open call is used to establish a connection to the driver. It enables the subsequent invocation of the intr_trigger and close routines.

The id input argument specifies a given remote BusCom device driver instance. It is provided by the device registry entry. Upon successful completion, the remote BusCom driver returns K_OK and passes the communication resources (back to the client) through the config output argument.

The BusComConfig structure specifies the memory region allocated for the inter-bus communication. The mem_base field specifies the region base address in the supervisor virtual address space. The mem_size specifies the region size in bytes. This region is located in the system memory of the remote site and it is accessible (through a bus) on this local site. The BusComHeader structure is located at the beginning of the region. The BusComHeader structure is initialized on the remote site in the following way. Each byte in the lborder field contains its address, i.e., byte 0 is 0, byte 1 is 1 and so forth. The rborder field is initalized to the BYTE_ORDER_LITTLE constant. The BusComHeader structure fields are used to detect the memory byte order with respect to the system memory (lborder) and to the shared memory mapping on the remote site (rborder). The value read from the lborder field specifies the shared memory byte order on the local site (BYTE_ORDER_LITTLE or BYTE_ORDER_BIG). The value read from the rborder field specifies whether the byte order is inverted with respect to the memory mapping on the remote site. If the BYTE_ORDER_LITTLE value is read, the byte order is the same, otherwise the byte order is inverted.

The remote BusCom driver returns K_ENOMEM if the system is out of memory resources. In this case, the config output argument is not modified.

The intr_trigger method is used to send a cross interrupt to the remote site. The id input argument specifies a given remote BusCom device driver instance. It is given by the device registry entry. The intr argument specifies the (virtual) cross interrupt event to send. Note that if a given cross interrupt number exceeds the number of physical cross interrupts supported by hardware, the last available physical cross interrupt is sent. As was mentioned above, the intr_trigger method may be called at interrupt level.

The close method is used to close connection to a remote BusCom driver. This call must be the last call made to the remote BusCom driver. The id input argument specifies a given remote BusCom device driver instance. It is given by the device registry entry.

A device node associated to a remote or local BusCom device driver instance has two properties:
device position in the communication domain
device path in the communication domain The "domain" (alias BUSCOM_PROP_DOMAIN) property specifies the communication device position in the domain. The property value is a BusComPropDomain structure, as shown in EB-217.

The BusComSite type (an integer 32-bit value) is used to enumerate all sites within a communication domain. The local field of the BusComPropDomain structure specifies the site on which the driver instance is running. The remote field of the BusComPropDomain structure specifies the site which is represented by the driver instance. Obviously, for a local BusCom driver instance both fields have the same value which designates the local site. On the other hand, for a remote BusCom driver instance these fields normally have different values.

The "path" (alias BUSCOM_PROP_PATH) property specifies the communication device path in the domain. The property value is a NULL terminated ASCII string. This path uniquely designates the remote site represented by the driver instance. Note that the remote site is equal to the local one for a local BusCom driver instance. So, for a local BusCom driver instance this property designates the site path in the communication domain.

Events will now be discussed.

A BusCom driver sends a shutdown event to its client in order to notify it about a site shutdown condition. There are two events which may be delivered to a BusCom driver client through the device registry event mechanism:
DEV_EVENT_SHUTDOWN
DEV_EVENT_REMOVAL The DEV_EVENT_SHUTDOWN event sent by a local BusCom device means that the local system is going to be shut down. So, the driver client is requested to gracefully shut down all connections in the communication domain and release all (local and remote) BusCom driver instances. Note that, the DEV_EVENT_SHUTDOWN event will also be signaled on each remote site for a remote BusCom driver instance representing this site.

The DEV_EVENT_REMOVAL event sent by a local BusCom device means that the local system has detected a fatal error. The driver client is requested to stop its activity as soon as possible and release all (local and remote) BusCom driver instances.

The DEV_EVENT_SHUTDOWN event sent by a remote BusCom device means that the remote system is going to be shut down. So, the driver client is requested to gracefully shut down all connections with this remote site and release the BusCom driver instance.

The DEV_EVENT_REMOVAL event sent by a remote BusCom device means that a fatal error (e.g., bus time out) has been detected while accessing remote memory or bridge interface registers. The driver client is requested to stop communication with this remote site as soon as possible and release the BusCom driver instance.

EA-6

This Logical Communication Layer section describes a basic communication protocol that is provided on top of the physical communication layer.

This basic communication layer is composed of three (logical) device classes:
bus multiplexer device
receive channel device
transmit channel device Each of these device classes provides a separate device driver interface described below.

The bus multiplexer driver is a client of the local and all remote BusCom driver instances running on the site. The main role of the bus multiplexer driver is to inform its clients about an inital configuration of the communication domain and all configuration changes (i.e., site insertion/removal) that happen in the domain. In addition, the bus multiplexer driver allows a client to create (and to destroy) a communication channel with a remote site. Such a communication channel is represented by a receive channel device on the local site and a transmit channel device on the remote site.

The character string "busmux" (alias BUSMUX_CLASS) names the BusMux device class. A pointer to the BusMux-Ops structure is exported by the driver via the svDeviceRegister microkernel call. A driver client invokes the svDeviceLookup and svDeviceEntry microkernel calls in order to obtain a pointer to the device service routines vector. Once the pointer is obtained, the driver client is able to invoke the driver service routines via indirect function calls.

A BusMux driver is multi-client device driver. In other words, a BusMux device driver instance may be looked up multiple times in the device registry. It is shown in EB-300.

The version field specifies the maximum BusMux DDI version number supported by the driver. The version number is incremented each time one of the BusMux DDI structures is extended in order to include new service routines. In other words, a new symbol is added to the BusMuxVersion enum each time the API is extended in this way.

A driver client specifies a minimum DDI version number required by the client when calling svDeviceLookup. The svDeviceLookup routine does not allow a client to look up a driver instance if the DDI version number supported by the driver is less than the DDI version number required by the client.

A client that is aware of DDI extensions may still specify a minimum DDI version when looking for a device in the registry. Once a device is successfully found, the client may examine the version field in order to take advantage of extended DDI features which may be supported by the device driver.

The open method is the first call a client must make to a BusMux device driver. The open call is used to establish a connection to the driver. It enables the subsequent invocation of the create, destroy and close routines. The id input argument specifies a given BusMux device driver instance. It is provided by the device registry entry. The proto input argument specifies a communication protocol implemented by the client. It is an integer value which should be arbitrarily assigned to all high-level communication protocols (e.g., Ethernet, ATM). The handler input argument specifies a client notification handler. This handler will be invoked by the BusMux driver each time a site insertion or removal is detected in the communication domain. The cookie input argument is passed back to the client as an argument of the notification handler.

This is shown in EB-301.

Together with the cookie argument, the notification handler also has two extra arguments. The event input argument specifies whether a site insertion or removal is detected in the communication domain. The BUSMUX_SITE_CONNECTED value means that a site has been inserted. The BUSMUX_SITE_DISCONNECTED value means that a site is removed. The site input argument specifies the site which has been inserted or removed.

The notification handler is called in the DKI thread context. This allows a client to directly invoke the create and destroy routines inside the handler. Upon successful completion, the BusMux driver returns K_OK and passes back to the client a connection identifier through the cid output argument. The connection identifier must be given to the BusMux driver in all subsequent invocation of the driver.

Note that the notification handler may be called by the BusMux driver before returning from open. This typically happens for all remote sites already present in the communication domain at open time. In this case, the BusMux driver guarantees that the cid output argument is already updated when the notification handler is invoked.

The BusMux driver returns K_ENOMEM if the system is out of memory resources. The BusMux driver returns K_EBUSY if another connection has been already established for a given protocol. If an error code is returned by the BusMux driver, the cid output argument is not altered. The open method must be called in the DKI thread context.

The create method is used to create a simplex (i.e., unidirectional) communication channel with a remote site belonging to the communication domain.

The cid input argument specifies an open connection to the BusMux driver. It is given by open. The channel input argument specifies the channel number being created. The site input argument specifies a remote site to which the channel will be created. The fifosize input argument specifies the memory size (in bytes) being allocated for the channel FIFO.

Upon successful completion, the BusMux driver returns K_OK and creates a receive channel device on the local site. At the same time, a transmit channel device is also created on the remote site. Note that the channel creation is asynchronous. In other words, the BusMux driver does not guarantee that both (transmit and receive) channels are created when returning from create. A channel client should use a new device notification mechanism provided by the device registry module. This means that, in order to be notified when a new channel is created, a client should attach a new device notification handler to the device registry. When such a handler is invoked by the registry, the client should scan the device registry in order to look up a newly created channel device.

The BusMux driver returns K_ENOMEM if the system is out of memory resources. The BusMux driver returns K_EOVERLAP if the system is out of the shared memory resources. In other words, there is not enough free space in the shared memory region to locate the channel descriptor and channel FIFO of a given size. The BusMux driver returns K_EBUSY if another connection with the same channel number already exists for a given protocol. The create method must be called in the DKI thread context.

The destroy method is used to destroy a given simplex communication channel which has been previously created via the create routine. The cid input argument specifies an open connection to the BusMux driver. It is given by open. The channel input argument specifies the channel number being destroyed.

Note that the function does nothing if a given channel does not exist. Note that the channel destruction is asynchronous. In other words, the BusMux driver does not guarantee that both (transmit and receive) channels are destroyed when returning from destroy. The destroy routine just starts the destruction process sending a shutdown event on both channel devices. Such a shutdown event will be received by channel clients on both sites. A channel will only be destroyed when both channel clients release both channel devices on local and remote sites. The destroy method must be called in the DKI thread context.

The close method is used to close connection to a BusMux driver. This call must be the last call made to the BusMux driver. The cid input argument specifies an open connection to the BusMux driver. It is provided by open.

Note that the close routine will destroy all previously created channels. Note also that the channels will be destroyed asynchronously. The close method must be called in the DKI thread context.

The character string "busmux-rx" (alias BUSMUX_RX_CLASS) names the BusMux Rx channel device class. A pointer to the BusMuxRxOps structure is exported by the driver via the svDeviceRegister microkernel call. A driver client invokes the svDeviceLookup and svDeviceEntry microkernel calls in order to obtain a pointer to the device service routines vector. Once the pointer is obtained, the driver client is able to invoke the driver service routines via indirect function calls.

A BusMux Rx channel driver is mono-client device driver. The device registry prevents multiple lookups being done on the same driver instance. It is shown in EB-302.

The version field specifies the maximum BusMux Rx channel DDI version number supported by the driver. The version number is incremented each time one of the BusMux Rx channel DDI structures is extended in order to include new service routines. In other words, a new symbol is added to the BusMuxRxVersion enum each time the API is extended in this way.

A driver client specifies a minimum DDI version number required by the client when calling svDeviceLookup. The svDeviceLookup routine does not allow a client to look up a driver instance if the DDI version number supported by the driver is less than the DDI version number required by the client.

A client that is aware of DDI extensions may still specify a minimum DDI version when looking for a device in the registry. Once a device is successfully found, the client may examine the version field in order to take advantage of extended DDI features which may be supported by the device driver.

The open method is the first call a client must make to a BusMux Rx channel device driver. The open call is used to establish a connection to the driver. It enables the subsequent invocation of the mask, unmask, receive, free and close routines. The id input argument specifies a given BusMux Rx channel device driver instance. It is given by the device registry entry.

The handler input argument specifies a client Rx handler. This handler is normally invoked by the BusMux Rx channel driver if the following conditions are met:
  last invoked receive has returned FALSE, in other words, a client has detected
  that the channel FIFO is empty
  the channel FIFO is not currently empty
  the channel is unmasked The cookie input argument is passed back to the client as the argument of the Rx handler, as shown in EB-303.

Note that the Rx handler may be falsely invoked by the BusMux Rx channel driver. This is due to a weak synchronization between the Rx and Tx channel drivers. The channel drivers do not utilize an atomic read-modify-write cycle. Such a feature may be unavailable on some busses (PCI for example). The channel drivers also avoid handling a classical mutual exclusion spin lock based on two variables. Such a spin lock would introduce unnecessary dependencies between the Tx and Rx channel drivers. In particular, when one site is suddenly down holding such a lock. This results in an inexact flow control which may introduce (usually a small number) of spurious (unnecessary) interrupts.

When the Rx handler is called, the channel is in a masked state. In other words, the BusMux Rx channel driver protects from re-entry in the Rx handler code. The channel is unmasked once the Rx handler returns to the BusBux Rx channel driver.

Upon successful completion, the BusMux Rx channel driver returns K_OK. Otherwise, K_ENOMEM is returned to notify that the system is out of memory resources.

Note that the channel is in a masked state by default, i.e., the Rx handler invocation is disabled. In order to enable the Rx handler invocation, the unmask routine should be called.

The open method may block. So, it must be called at base level only.

The mask method disables the invocation of the Rx handler if it has been previously enabled by unmask. The id input argument specifies a given BusMux Rx channel device driver instance. It is given by the device registry entry. The mask method must be called at base level only.

The unmask method enables invocation of the Rx handler if it has been disabled either implicitly by open or explicitly by a previously invoked mask routine. The id input argument specifies a given BusMux Rx channel device driver instance. It is provided by the device registry entry.

Note that interrupts received during a masked period are not lost. Once the channel is unmasked, the Rx handler is invoked if conditions listed above are met. The unmask method must be called at base level only. The mask/unmask pairs must not be nested.

The receive method is invoked by a client in order to obtain a pointer to the first frame of the channel FIFO. The id input argument specifies a given BusMux Rx channel device driver instance. It is provided by the device registry entry. If the channel FIFO is empty, the receive routine returns FALSE. Otherwise, the receive routine returns TRUE and passes the frame descriptor (back to the client) through the frame output argument.

A BusMux frame is specified by the BusMuxFrame structure. A frame may contain up to two fragments: head and tail. Each fragment is specified by the BusMuxChunk structure, shown in EB304. The addr field of the BusMuxChunk structure specifies the start address of the frame fragment in the supervisor address space. The size field of the BusMuxChunk structure specifies the frame fragment size in bytes. If the tail size is zero, the frame is contiguous and the frame start address and size are specified by the head descriptor. Otherwise, the frame is fragmented.

The frame head start address is always aligned to a four byte boundary. If frame is not contiguous, the head size and the tail start address are also always aligned to a four byte boundary. After a successful receive, a client is able to access the frame contents located into the channel FIFO.

Note that it is allowed to sequentially call the receive method multiple times. Once the receive routine returns TRUE, the subsequent invocation of the receive method will return the same frame descriptor. The receive method must be called either at base level or from the Rx handler.

The free method is invoked by a client in order to free memory occupied by the first frame in the channel FIFO. The released memory becomes available for transmission. The id input argument specifies a given BusMux Rx channel device driver instance. It is provided by the device registry entry.

If the channel FIFO is empty, the free routine behavior is unpredictable. The receive method must be called either at base level or from the Rx handler.

The close method is used to close connection to a BusMux Rx channel driver. This call must be the last call made to the driver. The id input argument specifies a given BusMux Rx channel device driver instance. It is provided by the device registry entry. The close method may block. Therefore, it must be called at base level only.

The character string "busmux-tx" (alias BUSMUX_TX_CLASS) names the BusMux Tx channel device class. A pointer to the BusMuxTxOps structure is exported by the driver via the svDeviceRegister microkernel call. A driver client invokes the svDeviceLookup and svDeviceEntry microkernel calls in order to obtain a pointer to the device service routines vector. Once the pointer is obtained, the driver client is able to invoke the driver service routines via indirect function calls.

A BusMux Tx channel driver is a mono-client device driver. The device registry prevents multiple lookups being done on the same driver instance.

It is shown in EB-305.

The version field specifies the maximum BusMux Tx channel DDI version number supported by the driver. The version number is incremented each time one of the BusMux Tx channel DDI structures is extended in order to include new service routines. In other words, a new symbol is added to the BusMuxRxVersion enum each time the API is extended in this way.

A driver client specifies a minimum DDI version number required by the client when calling svDeviceLookup. The svDeviceLookup routine does not allow a client to look up a driver instance if the DDI version number supported by the driver is less than the DDI version number required by the client.

A client that is aware of DDI extensions may still specify a minimum DDI version when looking for a device in the registry. Once a device is successfully found, the client may examine the version field in order to take advantage of extended DDI features which may be supported by the device driver.

The open method is the first call a client must make to a BusMux Tx channel device driver. The open call is used to establish a connection to the driver. It enables the subsequent invocation of the mask, unmask, alloc, transmit and close routines. The id input argument specifies a given BusMux Tx channel device driver instance. It is given by the device registry entry. The threshold input argument specifies a channel FIFO threshold. If threshold value is greater than the FIFO size, it is adjusted to the FIFO size. Note that if the channel FIFO threshold is set to zero, the Tx handler invocation is disabled. The handler input argument specifies a client Tx handler. This handler is invoked by the BusMux Tx channel driver if the following conditions are met:

The last invoked alloc has returned FALSE, in other words, a client has detected that the channel FIFO is full.

The channel FIFO threshold is not zero.

The channel FIFO free size is equal to or grater than the channel FIFO threshold.

The channel is unmasked.

The cookie input argument is passed back to the client as the argument of the Tx handler, as shown in EB-306.

Note that the Tx handler may be falsely invoked by the BusMux Tx channel driver. This is due to a weak synchronization between the Rx and Tx channel drivers. The channel drivers do not utilize an atomic read-modify-write cycle. Such a feature may be unavailable on some busses (PCI for example). The channel drivers also avoid handling a classical mutual exclusion spin lock based on two variables. Such a spin lock would introduce unnecessary dependencies between the Tx and Rx channel drivers. In particular, when one site is suddenly down holding such a lock. This results in an inexact flow control which may introduce (usually a small number) of spurious (unnecessary) interrupts.

When the Tx handler is called, the channel is in a masked state. In other words, the BusMux Tx channel driver protects from re-entry in the Tx handler code. The channel is unmasked once the Tx handler returns to the BusBux Tx channel driver.

Upon successful completion, the BusMux Tx channel driver returns K_OK. Otherwise, K_ENOMEM is returned to notify that the system is out of memory resources.

Note that the channel is in a masked state by default, i.e., the Tx handler invocation is disabled. In order to enable the Tx handler invocation, the unmask routine should be called. The open method may block. Therefore, it must be called at base level only.

The mask method disables invocation of the Tx handler if it has been previously enabled by unmask. The id input argument specifies a given BusMux Tx channel device driver instance. It is given by the device registry entry. The mask method must be called at base level only.

The unmask method enables invocation of the Tx handler if it has been disabled either implicitly by open or explicitly by a previously invoked mask routine. The id input argument specifies a given BusMux Rx channel device driver instance. It is given by the device registry entry.

Note that interrupts received during a masked period are not lost. Once the channel is unmasked, the Tx handler is invoked if conditions listed above are met.

The unmask method must be called at base level only. The mask/unmask pairs must not be nested.

The alloc method is invoked by a client in order to allocate space for a frame in the channel FIFO. The id input argument specifies a given BusMux Tx channel device driver instance. It is given by the device registry entry. The size input argument specifies the frame size. Note that, because a frame in the channel FIFO is prefixed by its size, there are extra four bytes (i.e., size of (BusMuxSize)) which need to be allocated in the channel FIFO for each frame.

If the channel FIFO is full (i.e., there is no room for frame of a given size), the alloc routine returns FALSE. Otherwise, the alloc routine returns TRUE and passes the frame descriptor (back to the client) through the frame output argument.

A BusMux frame is specified by the BusMuxFrame structure. A frame may contain up to two fragments: head and tail. Each fragment is specified by the BusMuxChunk structure. The addr field of the BusMuxChunk structure specifies the start address of the frame fragment in the supervisor address space. The size field of the BusMuxChunk structure specifies the frame fragment size in bytes. If the tail size is zero, the frame is contiguous and the frame start address and size are specified by the head descriptor. Otherwise, the frame is fragmented.

The frame head start address is always aligned to a four byte boundary. If frame is not contiguous, the head size and the tail start address are also always aligned to a four byte boundary.

After a successful alloc, a client is able to copy frame contents to the channel FIFO.

Note that it is possible to sequentially call the alloc method multiple times. In this case, the current alloc overrides the previous one. The alloc method must be called either at base level or from the Tx handler.

The transmit method is invoked by a client in order to start transmission of the previously allocated frame. The id input argument specifies a given BusMux Tx channel device driver instance. It is given by the device registry entry. If there is no frame allocated in the channel FIFO, the transmit routine behavior is unpredictable. In other words, a transmit routine invocation should always follow the successful invocation of alloc. The transmit method must be called either at base level or from the Tx handler.

The close method is used to close connection to a BusMux Tx channel driver. This call must be the last call made to the driver. The id input argument specifies a given BusMux Tx channel device driver instance. It is provided by the device registry entry. The close method may block. Therefore, it must be called at base level only.

A BusMux device node has a "site" (alias BUSMUX_PROP_SITE) property. The property value type is BusMuxSite. The property value specifies the local site identifier.

A BusMux Rx/Tx channel node has a "channel" (alias BUSMUX_PROP_CHANNEL) property. The property value is a BusMuxPropChannel structure which specifies the characteristics of a given communication channel, as shown in EB-307.

The lsite field specifies the local site identifier. The rsite field specifies the remote site identifier. The proto field specifies the channel protocol. It is provided at channel creation time. The channel field specifies the channel identifier. It is provided at channel creation time. The fifosize field specifies size (in bytes) of the channel FIFO. It is provided at the channel creation time. The lbswap field specifies whether the shared memory byte order is inverted with respect to the local memory. Obviously, lbswap is always FALSE for an Rx channel because the channel descriptor and FIFO are located in the local memory on the receiver site. Note that if lbswap is TRUE, a general purpose bcopy (or memcpy) routine cannot typically be used to copy a transmitting frame to the channel FIFO. This is due to the fact that such a bcopy routine is usually optimized to use word (4 bytes) or double-word (8 bytes) load/store instructions if possible. So, this does not work if the byte order is inverted between the source and destination memory.

The rbswap field specifies whether the shared memory byte order is inverted with respect to the memory mapping on the remote site. Note that lbswap is always FALSE for an Rx channel. So, the byte swapping (if needed) is always performed on a transmitter site.

Events will now be discussed.

When the BusMux driver receives a shutdown event from the local or a remote BusCom driver instance, it forwards the event to BusMux and Rx/Tx channel clients using the following strategy.

If a shutdown event is received from the local BusCom device, it is signaled on the BusMux device and all Rx and Tx channels.

If a shutdown event is received from a remote BusCom device, it is signaled on all Rx and Tx channels associated with a given remote site. In addition, the BusMux notification handler is invoked in order to signal the remote site disconnection.

Exhibit B - code extracts

EB-101

```
typedef uint32_f BusComSite;
typedef uint32_f BusComSize;
typedef uint32_f BusComSeq;
typedef uint32_f BusComLevel;
typedef struct BusComCtlOps {
   BusComCtlVersion version;
      KnError
      (*open)       (BusComCtlId          id,
                     BusComCtlUpCalls*    upcalls,
                     void*                cookie,
                     BusComCtlConnId*     cid);
      void
      (*close) (BusComCtlConnId cid);
      KnError
      (*site_declare)    (BusComCtlConnId    cid,
                          char*               cpath,
                          unsigned int        cplen,
                          BusComSite*         site,
                          BusComSeq*          seq);
      void
      (*site_shutdown) (BusComCtlConnId cid);
      void
      (*site_insertion)  (BusComCtlConnId    cid,
                          BusComSeq          seq,
                          BusComSite         src,
                          BusComDevice*      dev,
                          BusComMapping*     map,
                          char*              cpath,
                          unsigned int       cplen);
      void
      (*site_removal)    (BusComCtlConnId    cid,
                          BusComSite          src);
      void
      (*site_connect)    (BusComCtlConnId    cid,
                          BusComSite         dst,
                          BusComSite         src,
                          BusComDevice*      dev,
                          BusComMapping*     map,
                          char*              cpath,
                          unsigned int       cplen);
      void
```

-continued

Exhibit B - code extracts

```
        (*site_disconnect)      (BusComCtlConnId        cid,
                                BusComSite              dst,
                                BusComSite              src);
        void
        (*host_declare)         (BusComCtlConnId        cid,
                                BusComLevel             level,
                                char*                   cpath,
                                unsigned int            cplen);
    } BusComCtlOps;
EB-102 typedef uint32_f BusComIntr;
    typedef struct BusComCtlUpCalls {
        KnError
        (*intr_attach)          (void*                  cookie,
                                BusComIntr              intr,
                                BusComIntrHandler       intr_handler,
                                void*                   intr_cookie,
                                BusComIntrId*           intr_id);
        void
        (*intr_detach)          (BusComIntrId intr_id);
        void
        (*site_enable)          (void*                  cookie,
                                BusComSite              site,
                                BusComSeq               seq);
        KnError
        (*site_declare)         (void*                  cookie,
                                char*                   cpath,
                                unsigned int            cplen,
                                BusComSite*             site,
                                BusComSeq*              seq));
        void
        (*site_insertion)       (void*                  cookie,
                                BusComSeq               seq,
                                BusComSite              src,
                                BusComDevice*           dev,
                                BusComMapping*          map,
                                char*                   cpath,
                                unsigned int            cplen);
        void
        (*site_removal)         (void*                  cookie,
                                BusComSite              src);
        void
        (*site_connect)         (void*                  cookie,
                                BusComSite              dst,
                                BusComSite              src,
                                BusComDevice*           dev,
                                BusComMapping*          map,
                                char*                   cpath,
                                unsigned int            cplen);
        void
        (*site_disconnect)      (void*                  cookie,
                                BusComSite              dst,
                                BusComSite              src);
        void
        (*host_declare)         (void*                  cookie,
                                BusComLevel             level,
                                char*                   cpath,
                                unsigned int            cplen);
    } BusComCtlUpCalls;
EB-103 typedef uint32_f BusComDevType;                      /* bridge device architecture */
define BUSCOM_CTL_DEV_UNKNOWN      0                /* unknown bridge architecture */
#define BUSCOM_CTL_DEV_VME          1                /* VME bridge */
#define BUSCOM_CTL_DEV_PCI          2                /* PCI bridge */
        typedef struct BusComVmeDevInfo {
            /* TBD */
        } BusComVmeDevInfo;
        typedef struct BusComPciDevInfo {
            uint16_f ven_id;        /* PCI vendor ID */
            uint16_f dev_id;        /* PCI device ID */
            uint32_f primary;       /* primary/secondary interface
        */
        } BusComPciDevInfo;
        typedef union {
            BusComVmeDevInfo vme;   /* VME device */
```

Exhibit B - code extracts

```
        BusComPciDevInfo   pci;        /* PCI device */
    } BusComDevInfo;
    typedef struct BusComDevice {
        BusComDevType type;            /* bridge type (PCI, VME, ...)
*/
        BusComDevInfo info;            /* bridge info */
    } BusComDevice;
```
EB-104

```
    typedef uint32_f BusComBusType;
    #define BUSCOM_CTL_BUS_UNKNOWN    0    /* unknown bus architecture */
    #define BUSCOM_CTL_BUS_VME        1    /* VME 32-bit bus */
    #define BUSCOM_CTL_BUS_VME64      2    /* VME 64-bit bus */
    #define BUSCOM_CTL_BUS_PCI        3    /* PCI 32-bit bus */
    #define BUSCOM_CTL_BUS_PCI64      4    /* PCI 64 bit bus */
    typedef struct BusComVmeBusInfo {
        /* TBD */
    } BusComVmeBusInfo;
    typedef struct BusComVme64BusInfo {
        /* TBD */
    } BusComVme64BusInfo;
    typedef struct BusComPciBusInfo {
        PciIoSpace    reg_space;       /* PCI space where the bridge CSR are
mapped */
        PciAddr       reg_base;        /* CSR base address */
        PciSize       reg_size;        /* CSR size */
        PciAddr       mem_base;        /* memory region base address */
        PciSize       mem_size;        /* memory region size */
    } BusComPciBusInfo;
    typedef struct BusComPci64BusInfo {
        PciIoSpace    reg_space;       /* PCI space where the bridge CSR are
mapped */
        Pci64Addr     reg_base;        /* CSR base address */
        Pci64Size     reg_size;        /* CSR size */
        Pci64Addr     mem_base;        /* memory region base address */
        Pci64Size     mem_size;        /* memory region size */
    } BusComPci64BusInfo;
    typedef union {
        BusComVmeBusInfo       vme;        /* VME  (32-bit) */
        BusComVme64BusInfo     vme64;      /* VME  (64-bit) */
        BusComPciBusInfo       pci;        /* PCI  (32-bit) */
        BusComPci64BusInfo     pci64;      /* PCI  (64-bit) */
    } BusComBusInfo;
    typedef struct BusComMapping {
        BusComBusType type;            /* current bus architecture */
        BusComBusInfo info;            /* bridge mapping info */
    } BusComMapping;
```
EB-105

```
    typedef BusComIntrStatus (*BusComIntrHandler) (void* cookie);
```
EB-106

```
    typedef enum {
        BUSCOM_INTR_UNCLAIMED = 0,
        BUSCOM_INTR_CLAIMED
    } BusComIntrStatus;
```
EB-201

```
typedef struct BusComMsg {
    BusComSize        size;        /* total message size (including header) */
    BusComMsgType     type;        /* message type */
        } BusComMsg;
typedef uint32_f BusComMsgType;
#define BUSCOM_MSG_UNKNOWN                0
#define BUSCOM_MSG_SITE_DECLARE           1    /* site_declare( )        */
#define BUSCOM_MSG_SITE_SHUTDOWN          2    /* site_shutdown( )       */
#define BUSCOM_MSG_SITE_INSERTION         3    /* site_insertion( )      */
#define BUSCOM_MSG_SITE_REMOVAL           4    /* site_removal( )        */
#define BUSCOM_MSG_SITE_CONNECT           5    /* site_connect( )        */
#define BUSCOM_MSG_SITE_DISCONNECT        6    /* site_disconnect( )     */
#define BUSCOM_MSG_HOST_DECLARE           7    /* host_declare( )        */
#define BUSCOM_MSG_SITE_DECLARE_ACK       8    /* site_declare( ) ack    */
#define BUSCOM_MSG_SITE_SHUTDOWN_ACK      9    /* site_shutdown( ) ack   */
```
EB-202

```
typedef uint32_f BusComMsgToken;
typedef struct BusComMsg_site_declare {
```

|Exhibit B - code extracts|
|---|

```
            BusComMsg          header;       /* generic message header */
            BusComMsgToken     token;        /* acknowledge token */
            BusComSite         site;         /* suggested site UID */
            char               path;         /* communication path */
        } BusComMsg_site_declare;
        typedef struct BusComMsg_site_declare_ack {
            BusComMsg          header;       /* generic message header */
            BusComMsgToken     token;        /* token specified in
        site_declare */
            KnError            res;          /* call result */
            BusComSite         site;         /* assigned site UID */
            BusComSeq          seq;          /* assigned SDSQN */
        } BusComMsg_site_declare_ack;
EB-203 typedef struct BusComMsg_site_insertion {
            BusComMsg          header;       /* generic message header */
            BusComSeq          seq;          /* site SDSQN */
            BusComSite         src;          /* site UID */
            BusComDevice       dev;          /* interface descriptor */
            BusComMapping      map;          /* mapping descriptor */
            char               path;         /* site communication path */
        } BusComMsg_site_insertion;
EB-204 typedef struct BusComMsg_site_connect {
            BusComMsg          header;       /* generic message header */
            BusComSite         dst;          /* destination site UID */
            BusComSite         src;          /* source site UID */
            BusComDevice       dev;          /* source interface descriptor
        */
            BusComMapping      map;          /* source mapping descriptor */
            char               path;         /* source site communication
        path */
        } BusComMsg_site_connect;
EB-205 typedef struct BusComMsg_site_removal {
            BusComMsg          header;       /* generic message header */
            BusComSite         src;          /* site UID */
        } BusComMsg_site_removal;
EB-206 typedef struct BusComMsg_site_disconnect {
            BusComMsg          header;       /* generic message header */
            BusComSite         dst;          /* destination site UID */
            BusComSite         src;          /* source site UID */
        } BusComMsg_site_disconnect;
EB-207 typedef struct BusComMsg_host_declare {
            BusComMsg          header;       /* generic message header */
            BusComLevel        level;        /* communication level */
            char               path;         /* communication path */
        } BusComMsg_host_declare;
EB-208 typedef struct BusComMsg_site_shutdown {
            BusComMsg          header;       /* generic message header */
        } BusComMsg_site_shutdown;
EB-209 typedef struct BusComMsg_site_shutdown_ack {
            BusComMsg          header;       /* generic message header */
        } BusComMsg_site_shutdown_ack;
EB-211 typedef struct BusComLocOps {
          BusComLocVersion version;
            KnError
          (*open)         (BusComId         id,
                           BusComConfig*    config);
            KnError
          (*intr_attach)  (BusComId         id,
                           BusComIntr       intr,
```

-continued

Exhibit B - code extracts

```
                           BusComIntrHandler    intr_handler,
                           void*                intr_cookie,
                           BusComIntrId*        intr_id);
        void
        (*intr_detach)     (BusComIntrId intr_id);
        void
        (*close) (BusComId id);
    } BusComLocOps;
```
EB-212

```
    typedef struct BusComConfig {
        void*           mem_base;
        BusComSize      mem_size;
    } BusComConfig;
```
EB-213

```
    typedef struct BusComHeader {
        PropByteOrder lborder;
        PropByteOrder rborder;
    } BusComHeader;
```
EB-214

```
    typedef BusComIntrStatus (*BusComIntrHandler)(void* cookie);
```
EB-215

```
    typedef enum {
        BUSCOM_INTR_UNCLAIMED = 0,
        BUSCOM_INTR_CLAIMED
    } BusComIntrStatus;
```
EB-216

```
    typedef struct BusComRemOps {
        BusComRemVersion version;
        KnError
        (*open)         (BusComId         id,
                         BusComConfig*    config);
        void
        (*intr_trigger) (BusComId id,
                         BusComIntr intr);
        void
        (*close) (BusComId id);
    } BusComRemOps;
```
EB-217

```
typedef struct BusComPropDomain {
        BusComSite local;
        BusComSite remote;
    } BusComPropDomain;
```
EB-300

```
    typedef BusComSite BusMuxSite;
    typedef uint32_f BusMuxSize;
    typedef uint32_f BusMuxProto;
    typedef uint32_f BusMuxChannel;
    typedef struct BusMuxOps {
        BusMuxVersion version;
        KnError
        (*open)         (BusMuxId         id,
                         BusMuxProto      proto,
                         BusMuxHandler    handler,
                         void*            cookie,
                         BusMuxConnId*    cid);
        KnError
        (*create)       (BusMuxConnId     cid,
                         BusMuxChannel    channel,
                         BusMuxSite       site,
                         BusMuxSize       fifosize);
        void
        (*destroy)      (BusMuxConnId cid,
                         BusMuxChannel channel);
        void
        (*close) (BusMuxConnId cid);
    } BusMuxOps;
```
EB-301

```
    typedef enum {
        BUSMUX_SITE_CONNECTED    = 1,
```

| Exhibit B - code extracts |
| --- |

```
        BUSMUX_SITE_DISCONNECTED = 2
    } BusMuxEvent;
    typedef void (*BusMuxHandler)    (void*          cookie,
                                      BusMuxEvent    event,
                                      BusMuxSite     site);
EB-302 typedef struct BusMuxRxOps {
            BusMuxRxVersion version;
            KnError
            (*open)         (BusMuxRxId         id,
                             BusMuxRxHandler    handler,
                             void*              cookie);
            void
            (*mask) (BusMuxRxId id);
            void
            (*unmask) (BusMuxRxId id);
            Bool
            (*receive)      (BusMuxRxId         id,
                             BusMuxFrame*       frame);
            void
            (*free) (BusMuxRxId id);
            void
            (*close) (BusMuxRxId id);
        } BusMuxRxOps;
EB-303 typedef void (*BusMuxRxHandler) (void* cookie);
EB-304 typedef struct BusMuxChunk {
            uint8_f*        addr;
            BusMuxSize      size;
        } BusMuxChunk;
        typedef struct BusMuxFrame {
            BusMuxChunk head;
            BusMuxChunk tail;
        } BusMuxFrame;
EB-305 typedef struct BusMuxTxOps {
            BusMuxTxVersion version;
            KnError
            (*open)         (BusMuxTxId         id,
                             BusMuxSize         threshold,
                             BusMuxTxHandler    handler,
                             void*              cookie);
            void
            (*mask) (BusMuxTxId id);
            void
            (*unmask) (BusMuxTxId id);
            Bool
            (*alloc)        (BusMuxTxId         id,
                             BusMuxSize         size,
                             BusMuxFrame*       frame);
            void
            (*transmit) (BusMuxTxId id);
            void
            (*close) (BusMuxTxId id);
        } BusMuxTxOps;
EB-306 typedef void (*BusMuxTxHandler) (void* cookie);
EB-307 typedef struct BusMuxPropChannel {
            BusMuxSite       lsite;
            BusMuxSite       rsite;
            BusMuxProto      proto;
            BusMuxChannel    channel;
            BusMuxSize       fifosize;
            Bool             lbswap;
            Bool             rbswap;
        } BusMuxPropChannel;
```

What is claimed is:

1. A system, comprising:
a plurality of boards communicably coupled via an external bus;
wherein each of the plurality of boards comprises:
a processor;
a memory coupled to the processor;
a host driver module executable by the processor; wherein the host driver module comprises memory management functions configured to expose a portion of the memory to one or more others of the plurality of boards;
one or more slave driver modules executable by the processor, wherein each slave driver module corresponds to the host driver module of a respective other one of the plurality of boards;
an onboard bus;
a bus-to-bus bridge configured to couple the onboard bus to the external bus;
one or more bus communication driver modules executable by the processor, wherein each bus communication driver module is configured to communicate with a corresponding bus communication driver of a respective other one of the plurality of boards via the bus-to-bus bridge and across the external bus;
wherein each of the one or more bus communication driver modules is further configured to route communication from its corresponding bus communication driver module to the host driver module; and
wherein each of the one or more slave driver modules is configured to access a portion of memory exposed by its corresponding host driver module of a respective other one of the plurality of boards via one of the one or more bus communication driver modules and the corresponding bus communication driver module of the respective other board.

2. The system of claim 1, wherein each of the one or more slave driver modules is further configured to send an interrupt to the corresponding host driver module of a respective other one of the plurality of boards via one of the one or more bus communication driver modules and the corresponding bus communication driver module of the respective other board.

3. The system of claim 1, wherein one of the plurality of boards comprises a nexus driver module configured to route communication between each of one or more bus communication driver modules of the one of the plurality of boards and the host driver module of the one of the plurality of boards.

4. The system of claim 1, wherein the host driver module of a host board of the plurality of boards comprises a global host driver configured to broadcast a host declaration message to each of one or more others of the plurality of boards.

5. The system of claim 1, wherein each of the plurality of boards is configured to broadcast a site insertion message to each of one or more others of the plurality of boards.

6. The system of claim 1, wherein each of the plurality of boards is further configured to broadcast a site removal message to each of one or more others of the plurality of boards.

7. The system of claim 1, wherein one of the plurality of boards further comprises:
a second bus-to-bus bridge;
a sub-board, comprising:
a processor;
a memory coupled to the processor;
a host driver module executable by the processor; wherein the host driver module comprises memory management functions configured to expose a portion of the memory to the plurality of boards;
one or more slave driver modules executable by the processor, wherein each slave driver module corresponds to the host driver module of a respective one of the plurality of boards;
an onboard bus;
one or more bus communication driver modules executable by the processor, wherein each bus communication driver module is configured to communicate with a corresponding bus communication driver of a respective one of the plurality of boards;
wherein each of the one or more bus communication driver modules is configured to route communication from its corresponding bus communication driver module to the host driver module; and
wherein each of the one or more slave driver modules is configured to access a portion of memory exposed by its corresponding host driver module of a respective one of the plurality of boards via one or the one or more bus communication driver modules and its corresponding bus communication driver module of the respective one of the plurality of boards;
a separate bus-to-bus bridge configured to couple the onboard bus the to onboard bus of the sub-board;
an additional bus communication driver module executable by the processor configured to:
communicate with a corresponding bus communication driver module of the sub-board;
route communication from the corresponding bus communication driver module of the sub-board to the host driver module;
route communication from each of the one or more other bus communication driver modules to the corresponding bus communication driver module of the sub-board; and
route communication from the corresponding bus communication driver module of the sub-board to one of the one or more bus communication driver modules, wherein the one of the one or more bus communication driver modules is configured to route communication from the additional bus communication driver modules to its corresponding bus communication driver module of a respective one or more other board of the plurality of boards;
wherein each of the one or more slave driver modules of the sub-board is configured to access a portion of memory exposed by its corresponding host driver module of a respective one of the plurality of boards via the separate bus-to-bus bridge and via one of the one or more bus communication driver modules of the sub-board and a corresponding bus communication driver module of the respective one of the plurality of boards.

8. The system of claim 4, wherein, in response to receiving the host declaration message, each of the plurality of boards is configured to send a site declaration request message to the global host driver.

9. The system of claim 5, wherein each of the plurality of boards is configured to, in response to receiving a site insertion message from one of the one or more others of the plurality of boards, initiate one of the one or more slave driver modules, wherein the initiated slave driver module corresponds to a host driver module of the board from which the site insertion message was received.

10. The system of claim 5, wherein each of the plurality of boards is further configured to, in response to receiving a site insertion message from one of one or more others of the plurality of boards, send a site connection message to the board from which the site insertion message was received.

11. The system of claim 8, wherein in response to receiving the site declaration request message, the global host driver is further configured to send a site declaration response message, wherein the site declaration response message comprises a site identifier, wherein the site identifier is unique for each respective one of the plurality of boards.

12. The system of claim 10, wherein each of the plurality of boards is further configured to, in response to receiving a site connection message from one of the one or more others of the plurality of boards, initiate one of the one or more slave driver modules, wherein the initiated slave driver module corresponds to a host driver module of the board from which the site connection message was received.

13. The system of claim 12, wherein each of the plurality of boards is further configured to, in response to receiving a site removal message from one of one or more others of the plurality of boards, terminate one of the one or more slave driver modules, wherein the terminated slave driver module corresponds to a host driver module of the board from which the respective site removal message was received.

14. The system of claim 13, wherein each of the plurality of boards is further configured to, in response to receiving a site removal message from one of one or more others of the plurality of boards, send a site disconnection message to the board from which the respective site removal message was received.

15. The system of claim 14, wherein each of the plurality of boards is further configured to, in response to receiving a site disconnection message from one of the one or more others of the plurality of boards, terminate one of the one or more slave driver modules, wherein the terminated slave driver module corresponds to a host driver module of the board from which the site disconnection message was received.

16. A method, comprising:
  a host driver module of a board exposing a portion of a memory on the board to each of one or more other boards, wherein an external bus communicably couples the board to each of the one or more other boards, wherein the board comprises an onboard bus and a bus-to-bus bridge configured to couple the onboard bus to the external bus;
  each of one or more bus communication driver modules of the board communicating with a corresponding bus communication driver module of a respective one of the one or more other boards via the bus-to-bus bridge and across the external bus;
  each of the one of more bus communication driver modules routing communication from its corresponding bus communication driver module to the host driver module; and
  each of one or more slave driver modules of the board accessing a portion of memory exposed by a corresponding host driver module of a respective one of the one or more other boards via one of the one or more bus communication driver modules and the corresponding bus communication driver module of the respective other board.

17. The method of claim 16, further comprising one of the one or more slave driver modules sending an interrupt to a corresponding host driver module of one of the one or more other boards via one of the one or more bus communication driver modules and a corresponding bus communication driver module of the one of the one or more other boards.

18. The method of claim 16, further comprising a nexus driver of the board routing communication between each of the one or more bus communication driver modules and the host driver module.

19. The method of claim 16, further comprising the host driver module broadcasting a host declaration message to each of the one or more other boards.

20. The method of claim 16, further comprising the host driver module receiving a host declaration message from one of the one or more other boards and in response to said receiving sending a site declaration request message to the board from which the host declaration message was received.

21. The method of claim 16, further comprising the host driver module broadcasting a site insertion message to each of the one or more other boards.

22. The method of claim 16, further comprising:
  receiving a site insertion message from one of the one or more other board; and
  in response to receiving a site insertion message from one of the one or more other boards, initiating one of the one or more slave driver modules, wherein the initiated slave driver module corresponds to a host driver module of the board from which the site insertion message was received.

23. The method of claim 16, further comprising broadcasting a site removal message to each of the one or more other boards.

24. The method of claim 16, further comprising:
  receiving a site removal message from one of the one or more other boards; and
  in response to receiving a site removal message from one of the one or more other boards, terminating one of the one or more slave driver modules, wherein the terminated slave driver module corresponds to a host driver module of the board from which the site removal message was received.

25. The method of claim 16, further comprising:
  receiving a site disconnection message from one of the one or more other boards; and
  in response to receiving a site disconnection message from one of the one or more other boards, terminating one of the slave driver modules, wherein the terminated slave driver module corresponds to a host driver module of the board from which the site disconnection message was received.

26. The method of claim 16, further comprising:
  an additional bus communication driver module communicating with a corresponding bus communication driver module of a sub-board of the board, wherein an onboard bus of the sub-board is coupled to the onboard bus of the board via an additional bus-to-bus bridge of the board;
  the additional bus communication driver module routing communication from the corresponding bus communication driver module of the sub-board to the host driver module;
  the additional bus communication driver module routing communication from one or more of the one or more bus communication driver modules to the corresponding communication driver module of the sub-board;
  the additional bus communication driver module routing communication from the corresponding bus communication driver module of the sub-board to one of the one or more bus communication driver modules, wherein the one of the one or more bus communication driver modules is configured to route communication from the additional bus communication driver module to a corresponding bus communication driver module of one of the one or more other boards; and a slave driver module of the sub-board accessing memory exposed by the host driver module via a bus communication driver module of the sub-board and a corresponding bus communication driver module of the board.

27. The method of claim 19, further comprising the host driver module receiving a site declaration request message from one or more of the one or more other boards.

28. The method of claim 24, further comprising, in further response to receiving a site removal message from one of the one or more other boards, sending a site disconnection message to the board from which the site removal message was received.

29. The method of claim 26, further comprising:
a slave driver module of the sub-board accessing memory exposed by a host driver module of another one of the one or more other boards, wherein said accessing memory comprises:
the slave drive module of the sub-board communicating with a bus communication driver module of the sub-board;
the sub communication drive module of the sub-board communicating with the additional bus communication driver module of the board;
the additional corresponding bus communication driver module communicating with one of the one or more bus communication driver modules of the board; and
the one of the one or more bus communication driver modules communicated with a corresponding bus communication driver module of the another one of the one or more boards.

30. The method of claim 26, further comprising a slave driver module of one of the one or more other boards accessing memory exposed by a host driver module of the sub-board, where said accessing memory comprises:
the slave drive module of the one of the one or more other boards communicating with a bus communication driver module of the one of the one or more other boards;
the sub communication drive module of the one of the one or more other boards communicating with one of the one or more bus communication driver modules of the board;
the one of the one or more bus communication driver modules of the board communicating with the additional corresponding bus communication driver module; and
the additional corresponding bus communication driver module communicating with a corresponding bus communication driver module of the sub-board.

31. The method of claim 27, further comprising the host driver module, in response to receiving a site declaration request message from one of the one or more other boards, sending a site declaration response message to the board from which the site declaration message was received.

32. A computer accessible medium, comprising program instruction configured to implement:
a host driver module of a board exposing a portion of a memory on the board to each of one or more other boards, wherein an external bus communicably couples the board to each of the one or more other boards, wherein the board comprises an onboard bus and a bus-to-bus bridge configured to couple the onboard bus to the external bus;
each of one or more bus communication driver modules of the board communicating with a corresponding bus communication driver module of a respective one of the one or more other boards via the bus-to-bus bridge and across the external bus;
each of the one of more bus communication driver modules routing communication from its corresponding bus communication driver module to the host driver module; and
each of one or more slave driver modules of the board accessing a portion of memory exposed by a corresponding host driver module of a respective one of the one or more other boards via one of the one or more bus communication driver modules and the corresponding bus communication driver module of the respective other board.

* * * * *